United States Patent [19]
De Bonet

[11] Patent Number: 5,899,999
[45] Date of Patent: May 4, 1999

[54] ITERATIVE CONVOLUTION FILTER PARTICULARLY SUITED FOR USE IN AN IMAGE CLASSIFICATION AND RETRIEVAL SYSTEM

[75] Inventor: Jeremy S. De Bonet, Cambridge, Mass.

[73] Assignee: Microsoft Corporation, Redmond, Wash.

[21] Appl. No.: 08/732,614

[22] Filed: Oct. 16, 1996

[51] Int. Cl.$^6$ .................................................. G06F 17/30
[52] U.S. Cl. ......................... 707/104; 382/167; 382/254; 600/443
[58] Field of Search .......................... 707/104; 382/133, 382/167, 203, 232, 233, 240, 254, 443; 360/78.09; 356/139.01, 376; 378/15, 62; 364/724.1; 600/443

[56] References Cited

U.S. PATENT DOCUMENTS

| | | | |
|---|---|---|---|
| 5,717,789 | 2/1998 | Anderson | 382/254 |
| 5,779,641 | 7/1998 | Hatfield | 600/443 |
| 5,793,885 | 8/1998 | Kasson | 382/167 |
| 5,840,032 | 11/1998 | Hatfield | 600/443 |

OTHER PUBLICATIONS

"The QBIV Project", *IBM QBIC Almaden web site*, home page (pp. 1–2); printed Sep. 11, 1996.

"A show and tell of the QBIC technology—Query By Image Content (QBIC)", *IBM QBIC Almaden web site*, pp. 1–4; printed Sep. 11, 1996.

"IBM Ultimedia Manager 1.1 and Client Search", *IBM software web site*, pp. 1–4; printed Sep. 12, 1996.

"Photobook", *MIT Media Lab web site*; Aug. 7, 1996; pp. 1–2.

"Four Eyes", *MIT Media Lab web site*; pp. 1–2; printed Sep. 12, 1996.

"Virage—Visual Information Retrieval", *Virage Incorporated, home page*; printed Sep. 11, 1996.

"Workshop Report: NSF—ARPA Workshop on Visual Information Management Systems", *Virage Incorporated website*; pp. 1–15; printed Sep. 11, 1996.

Corporate Overview, *Virage Incorporated web site*; pp. 1–4; printed Sep. 11, 1996.

"Virage Products", *Virage Incorporated web site*; pp. 1–2; printed Sep. 11, 1996.

"Frequently asked questions about visual information retrieval", *Virage Incorporated web site*; pp. 1–3; printed Sep. 11, 1996.

"Visual Information Retrieval: A Virage Perspective Revision 3", *Virage Incorporated web site*; 1995; pp. 1–13; printed Sep. 11, 1996.

(List continued on next page.)

*Primary Examiner*—Paul R. Lintz
*Assistant Examiner*—Diane D. Mizrahi
*Attorney, Agent, or Firm*—Michaelson & Wallace; Peter L. Michaelson

[57] ABSTRACT

Apparatus and an accompanying method for an iterative convolution filter for determining an image signature and which is particularly useful in a system for automatically classifying individual images, on a numerical basis, in, e.g., an image database, and, through a query-by-example paradigm, retrieving a desired image(s) therefrom. Specifically, a signature is computed for an image using multi-level (e.g. L levels) iterative convolution filtering, with pixel values for each color axis supplied as input to each filtering level being separately convolved with each one of a set of, e.g., K predefined kernels, each being, e.g., a derivative of a Guassian kernel, to yield an output image. Each of the output images, of which $K^L$ occur for each color axis, is either applied as input to the next filtering level or applied to a summer to yield a resultant sum over all pixel values in that particular output image. This sum becomes the value of a corresponding one of $K^L$ elements, for each color axis, in the signature.

33 Claims, 13 Drawing Sheets

OTHER PUBLICATIONS

T. Minka, "An Image Database Browser that Learns from User Interaction", *Masters Thesis, Massachusetts Institute of Technology;* 1996; also appears as MIT Media Laboratory Technical Report 365.

J. Wachman, "A Video Browser that Learns by Example", *Masters Thesis, Massachusetts Institute of Technology;* 1996; also appears as MIT Media Laboratory Technical Report No. 383.

C. Faloutsos et al, "Efficient and Effective Querying by Image Content", *Journal of Intelligent Information Systems: Integrating Artificial Intelligence and Database Technologies,* vol. 3–4, No. 3, Jul. 1994, pp. 231–262.

R.W. Picard et al, "finding Similar Patterns in Large Image Databases", *IEEE ICASSP, Minneapolis, Minnesota,* vol. V, pp. 161–164, Apr. 1993; also appears in MIT Media Laboratory Technical Report No. 205.

W.T. Freeman et al, "The Design and Use of Steerable Filters", *IEEE Transactions on Pattern Analysis and Machine Intelligence,* vol. 15, No. 9, Sep. 1991, pp. 891–906.

U.S. application No. 08/732,615, DeBonet, filed Oct. 16, 1996.

U.S. application No. 08/732,616, DeBonet, filed Oct. 16, 1996.

COMPOUND AND HALF-LEVEL KERNELS

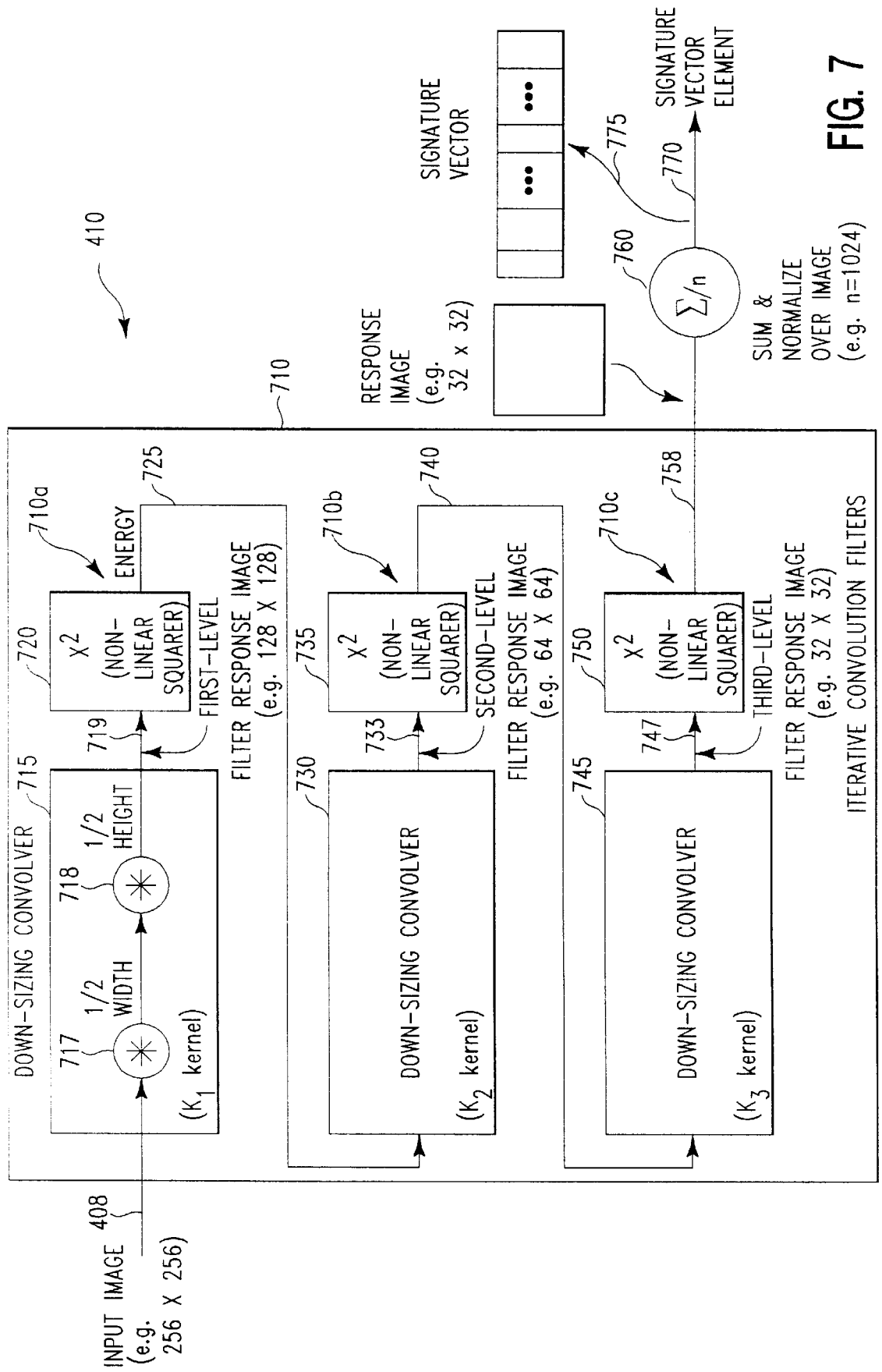

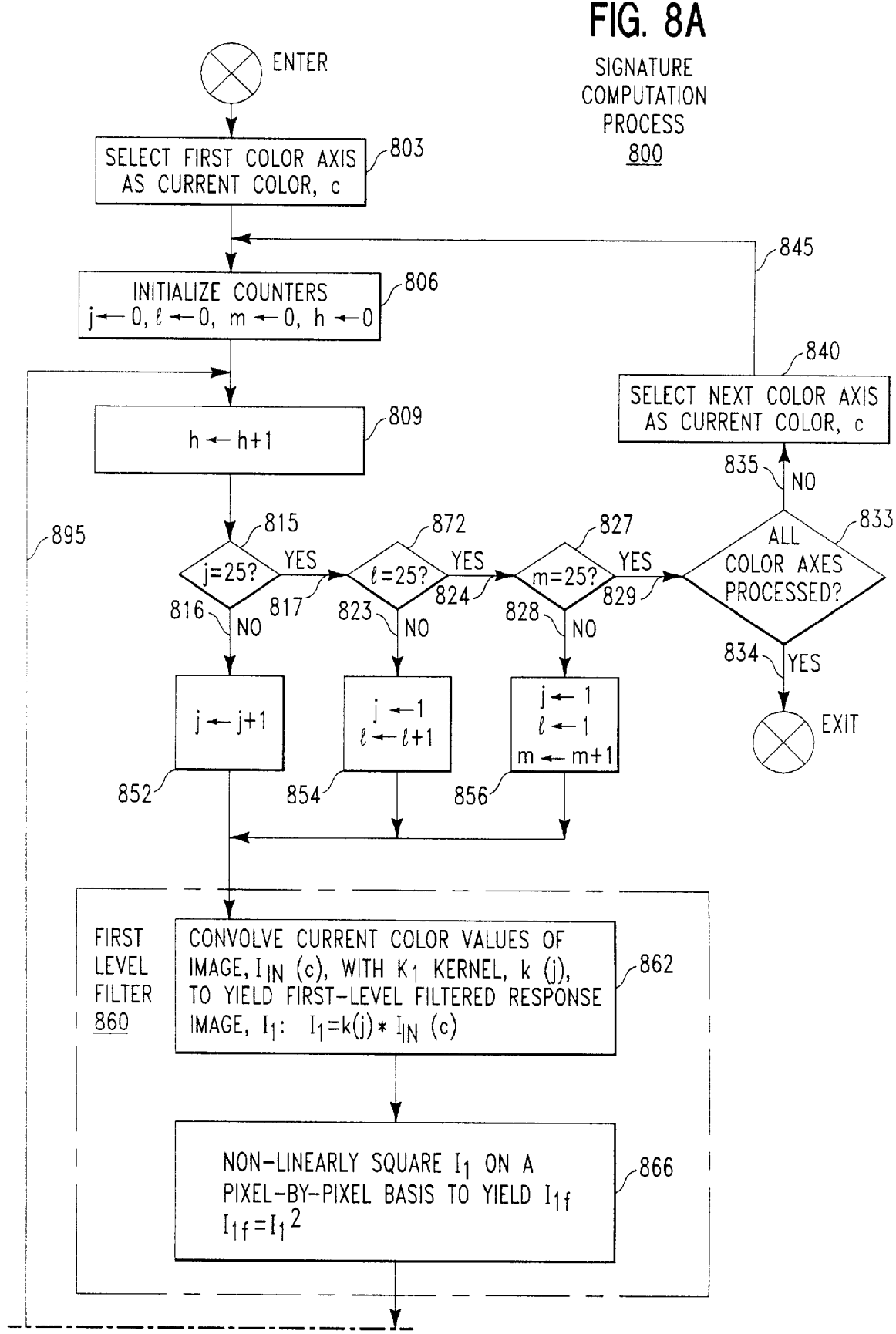

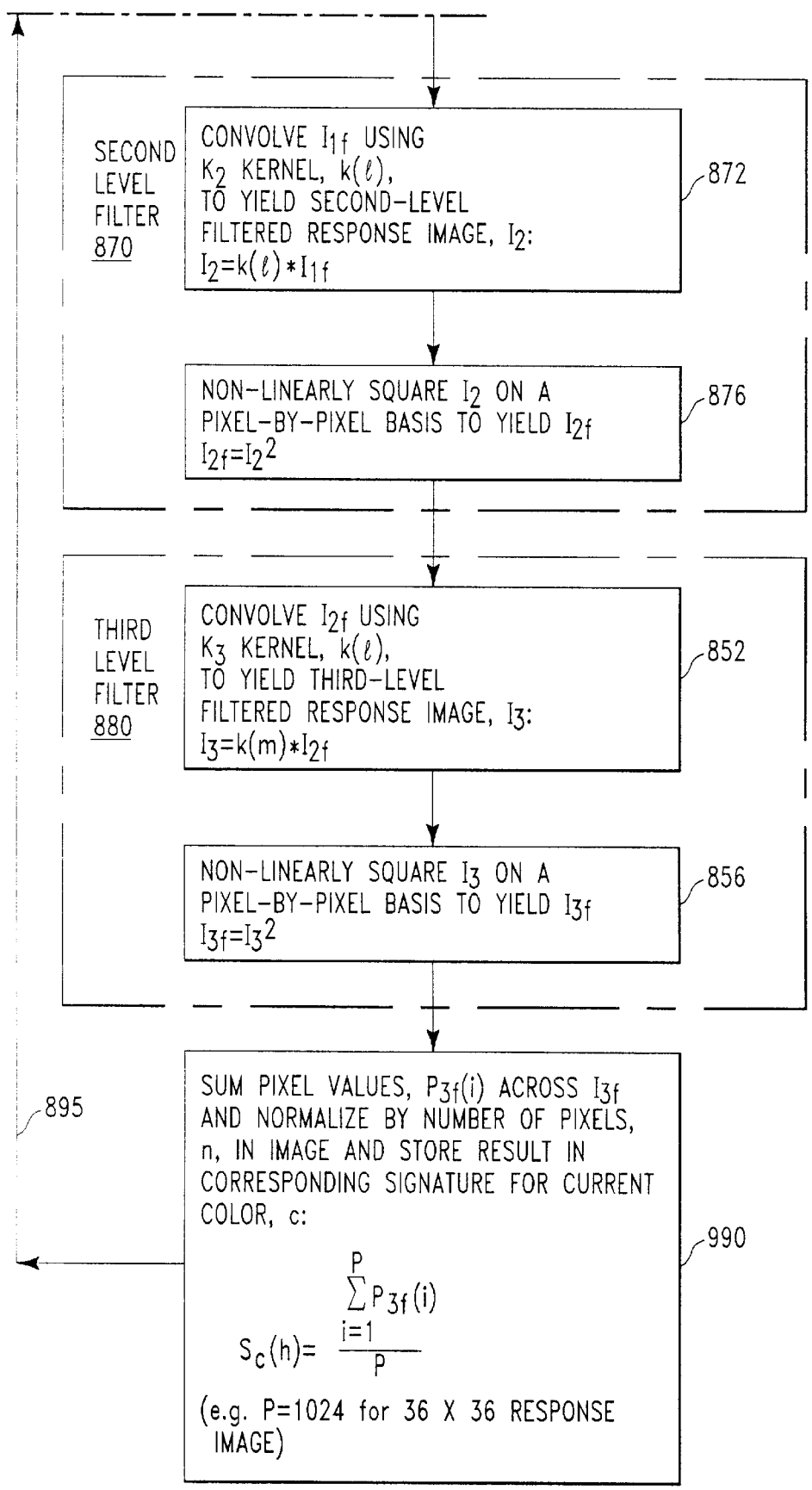

QUERY IMAGES

SEARCH RESULTS

QUERY IMAGES

SEARCH RESULTS

FIG. 12A
QUERY IMAGES
1200
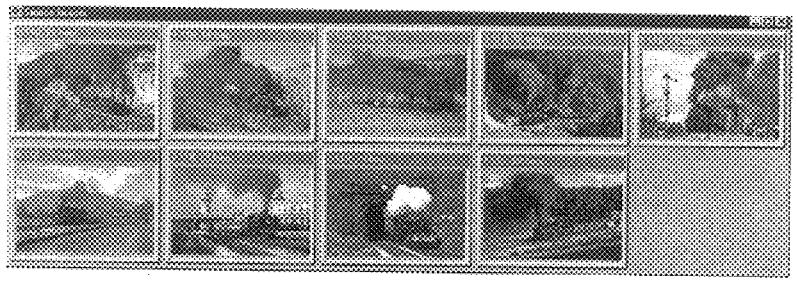
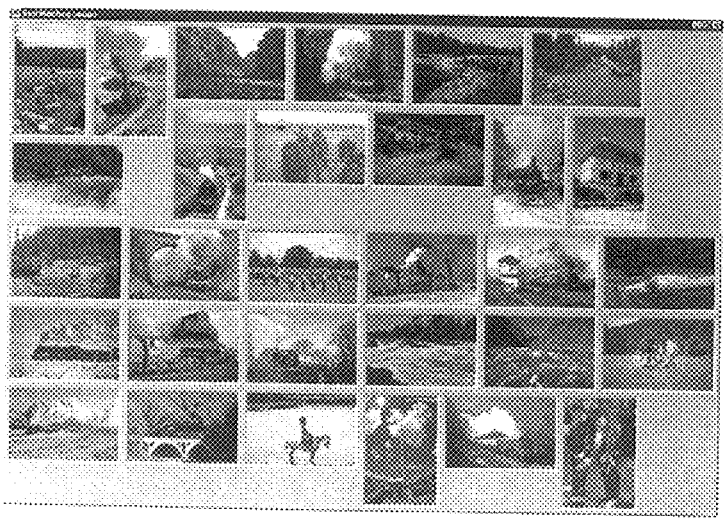
1250
SEARCH RESULTS
FIG. 12B ns,999

ITERATIVE CONVOLUTION FILTER PARTICULARLY SUITED FOR USE IN AN IMAGE CLASSIFICATION AND RETRIEVAL SYSTEM

BACKGROUND OF THE DISCLOSURE

1. Field of the Invention

The invention relates to apparatus and an accompanying method for an iterative convolution filter for determining an image signature and which is particularly useful in a system for automatically classifying individual images, on a numerical basis, in, e.g., an image database, and, through a query-by-example paradigm, retrieving a desired image(s) therefrom.

2. Description of the Prior Art

Textual representations constitute a relatively small portion of all the currently available information in the world. Nevertheless, dating back many centuries, textual representations, whether handwritten or machine printed, have been and are still used to abstract and convey information from one person to another through a printed (including numeric) alphabet, with language and numbers representing semantic concepts. However, a language by its very nature of representing abstract concepts through an organized contextual hierarchy built on a finite vocabulary, be it words or pictographs (e.g., words, having given meanings—though contextually variable, are grouped by an individual into sentences, sentences into paragraphs, and so forth), often results in communication that is indefinite and ambiguous. An image, unburdened by the limitations inherent in any language, is a far more efficient vehicle to convey information among individuals than text is now and is ever likely to be. Accordingly, humans constantly use their sense of vision in perceiving information and communicating it amongst themselves. As such, the world is awash in and dominated by visual information of one sort or another, whether it is, e.g., a single image such as on a photographic print, printed on a piece of paper or stored in an electronic memory, or a sequence of images such as in a motion picture or in a video signal. Images are so prevalent, as a means of communication, that humans create a huge and escalating number of new images every single day. Recent advances in computing and telecommunications are only increasing the use and dominance of visual information in modern day life.

Many different ways exists to classify and search textual information, particularly with a computer. Any textual item, by its very nature, residing in that database is written in a language, such as English, that, for the most part, has a well-defined and bounded vocabulary. Such a vocabulary readily lends itself to searching for any word (or other similar granular linguistic construct) to locate a stored textual entry of interest. While a textual database itself can be inordinately large, i.e. contain an extraordinarily massive amount of different textual entries, various algorithms exist, which by exploiting a well-defined vocabulary and its usage inherent in a language, such as English, permits a computer to efficiently index and retrieve any of the items stored in the database. In that regard, certain of these algorithms index an item by examining it for the presence of any so-called "keywords". Once any such word is found, a pointer to a stored record of that textual item is added to an appropriate classification (list) defined by (and data structure associated with) that keyword. Each such classification, generally consists of a list of pointers, with each pointer defining a location in a massive textual database at which the corresponding textual record for that item (or a portion thereof, such as an bibliographic abstract) is stored. All the keyword lists collectively define a keyword database. Keyword based retrieval systems generally operate by querying the keyword database with a user supplied keyword(s) to retrieve pointers to all the corresponding records that contain the keyword(s) and then present these pointers (in the form of a numbered list of records) to the user for subsequent selection thereamong. Once the user has selected which records (s)he wants, (s)he can then instruct the system to retrieve, display and/or print the complete item stored within each of the selected records.

Unlike text, an image, from a semantic perspective, is not defined by a linguistic or mathematical vocabulary. In that regard, any such vocabulary is often inadequate to fully describe all but very simple images. As such, human beings, whose communication is biased heavily towards using linguistic based verbal and printed expressions, are ill-equipped to fully describe anything more complex than a very simple image.

Given this linguistic deficiency, then, not surprisingly, computerized information search systems, have yet to, and probably will not for some time, be developed that can semantically categorize an image. Hence, users of existing computerized search systems had little choice but to find a desired image indirectly—by performing a keyword search to locate, e.g., an article that contained not only a textual description of a desired image, such as in a figure caption, but also hopefully (though without any guarantees) the desired image itself. However, this approach often failed and hence frustrated the user because it still relied on a linguistic description—one that was inadequate to fully describe just the particular image which the user wanted and, not surprisingly, often returned an article(s) having a wrong image(s) from that desired.

In view of an increasing predominance of imagery in present day (and, certainly, expected future) communications, a general problem, thusfar unmet in the art, has existed, for some time—though recently becoming more acute, as to just how images, by themselves and devoid of accompanying descriptive text, can be efficiently and accurately manipulated, i.e. how such large numbers of images can first be indexed into an image database and a desired image(s) then accurately retrieved therefrom.

Given the absence of a suitable vocabulary to describe image semantics, conventional image classification and retrieval schemes simply relied on a human being to subjectively assess semantic content of images, on an image-by-image basis, for both indexing and retrieval.

In particular, a conventional image repository, commonly referred to as a "photo shop", usually employs an individual to view, become familiar with and appropriately index each and every image in an image collection. Subsequently, a customer, seeking a certain image, will verbally describe various salient aspects of that image in an effort to convey a "gut feeling" of the image to that employee. As an example, suppose a customer desires an image of John Kennedy evoking an appearance of "determination". The employee, using his (her) knowledge of the image collection, will then retrieve an image from the collection thought to be most similar to that which the customer has described. For example, the employee may first examine a group of images may have been classified as depicting Presidents in office. The employee will present the retrieved image, perhaps an image of a concerned Kennedy sitting at desk in the Oval Office during a meeting involving the Cuban Missile Crisis, to the customer and request whether that image is the one desired or not, and, if not, why, in terms of differences between the desired and retrieved images, the retrieved image is not desired. In this situation, the customer may respond by stating that he (she) wants an image of Kennedy standing in front of an American flag rather than in the Oval Office. Armed with this information, the employee will then return to the collection to narrow the search and retrieve a closer image, if it is available, such as, e.g., Kennedy giving a charged public speech in West Berlin, to that desired. This manual process will iteratively repeat until either all the similar images in the collection, have been retrieved by the employee and rejected or the desired image (or one sufficiently similar) has been found. Alternatively, depending on the granularity of the index, a relatively large group of images may be found, such as all those containing past Presidents, through which a user or customer will be forced to manually examine, in seriatim, each image in the group to locate the desired image. Though human experiences are generally similar across different people, each person who views and indexes images does so based on his (her) own subjective criteria. While these criteria are generally quite broad (such as here perhaps including past Presidents as one, and American flags as another) and to a certain extent overlap among individuals (another individual might use Presidents in public), the decision as to whether an image possesses a given semantic content, hence falling within one of a number of given criteria and then should be retrieved or not based on a verbal description of what is desired, is highly subjective and, for a common image, often varies widely across different viewers. While a single human can index and effectively deal with perhaps as much as 100,000 different images or so, a photo shop often has a collection of considerably more images, such as several 100K images to several million, if not more. With such large collections, indexing is performed by several different individuals; the same occurs for retrieval. Hence, owing to the highly subjective nature of human-based indexing and retrieval, inconsistent results often occur from one individual to the next.

Moreover, no finer granularity than relatively broad criteria (e.g., images of "chairs") is generally used to classify images. Also, in large image collections, images, possessing one criteria (e.g. "chairs"), are generally not cross-indexed, to images possessing another criteria (e.g. depicting "gardens") such that images having both criteria, i.e. a sub-set (e.g. "a chair in a garden") can be readily located by itself and to the exclusion of images having just one of the criteria (e.g. just chairs or just gardens). Furthermore, images are classified with a limited and bounded set of linguistic criteria (e.g. an image of a "chair"). Unfortunately, doing so often results in a customer describing an image using terms (e.g. an image of a "light switch") that have not been used as a class descriptor. Thus, such manual image indexing and retrieval methodologies tend to be highly frustrating and inefficient to use, and quite problematic in their results.

While such manual approaches are still used with relatively small image collections, these approaches become totally useless if one desires to index massive numbers of images provided by, e.g., many currently available image sources. For example, a single video stream, such as programming carried over a broadcast channel, contains a substantial number of images, though successive images possess significant commonality. Currently, hundreds of different cable channels are available each providing a different video stream. To form a comprehensive image database, each and every different image in each video stream might need to be indexed. A similar problem would be posed by indexing images that appear in all recorded footage. Another source of a potentially infinite number of images is the world wide web wherein the number of new visual data sites continues to exponentially grow, with the images provided therefrom exponentially increasing at a significantly greater rate. In any event, a huge number of different images exist both now and increasingly so in the future which are likely to constitute an image database, with far more images than any manual methodology can handle.

Clearly, indexing all such images from all such sources, or even just a small fraction of these images, into a common image database is an enormous task which is only feasible, if at all, if it can be automated in some fashion.

In an effort to overcome the deficiencies inherent in conventional manual indexing and retrieval methodologies, the art has indeed turned to automated, i.e. computerized, techniques. However, in practice, none of these techniques has yet proven entirely satisfactory.

One such technique involves a so-called "query by image content (QBIC)" paradigm. This technique is typified by work currently undertaken in "The QBIC Project" by IBM Corporation (see the web site at http://wwwqbic.almaden.ibm.com), in the so-called "Visual Information Retrieval" technology being developed at Virage Corporation (see the web site at http://www.virage.com); and in the "Photobook" project currently underway at the Media Lab at Massachusetts Institute of Technology (see the web site at http://www-white.media.mit.edu/vismod/demos/photobook). In general, the QBIC technique relies on classifying an image according to a relatively small number of pre-defined fixed image features (also referred to as characteristics or attributes), such as distribution of color across an image, shapes in an image including their position and size, texture in an image, locations of dominant edges of image objects and regions, and so forth. For each image, a computerized system scans the image and measures each such characteristic. The premise behind using such characteristics is to mimic those visual attributes with which humans are familiar and use in recognizing an image. Once these attributes are measured for each image, a sequence of numeric values, i.e. a vector, results for that image. A user desiring to find a given image in a QBIC image database queries the database by providing an example of an image similar to that which he (she) desires and then setting a weight for each such characteristic in a fashion he (she) believes accurately reflects the presence of each attribute in the desired image as compared to that in the test image. For example, if a desired image is to have less variation in color across the image than does the test image, then the user will ostensibly choose a relatively low weight for color distribution, and so forth for other weights. The attributes in the example image are then measured. To retrieve an image, the system compares the vector for the test image, modified by the weights provided by the user, to the vector for each image in the database. A difference measure, based on a mathematical difference, between these two vectors is computed for each database image. The retrieved image with the lowest difference measure is then presented to the user. The user, upon viewing that retrieved image, can adjust the weights to refine the selection process in an attempt to retrieve another image closer to that which he (she) desires, and so forth, until presumably the closest image in the database to that desired is eventually retrieved.

While the QBIC technique represents an advance in machine based image indexing and retrieval, this technique suffers two basic infirmities.

First, the number of attributes is generally limited to between 5–10. This very small number simply fails to provide sufficient resolution to adequately describe the visual characteristics of most images. While, at first blush, it would seem trivial to extend a set of attributes to encompass additional ones, considerable difficulty exists in specifying just what each additional attribute should be. Specifically, as additional characteristics are added, they tend to become increasingly abstract and difficult for a user to comprehend and visualize.

Second, the user is burdened with selecting the proper numeric value for each weight. Not only is the user rather ill-equipped for the task of deciding just what value should be used for each weight for a visually apparent attribute, but as additional increasingly abstract image attributes are used particularly those which the user can not readily visualize and comprehend, the difficulty inherent in this task greatly compounds.

As a result of these practical limitations, the number of image attributes in a QBIC system remains small at approximately 5–10 rather broad characteristics.

Consequently, a fairly large group of images are usually produced in response to any query to a QBIC system, necessitating that the user manually review each and every resulting image. Doing so is often quite labor and time intensive and, as such, generally infeasible for practical use.

Apart from a significant effort potentially required of a user during a search, the user generally needs to expend a considerable amount of time and effort just to properly learn how to use a QBIC system, including how to correctly set the weights. Inasmuch as any user will still set the weights subjectively, then, if different users—even those who are highly trained—were to search for a common image in a common image database, the subjectivity exhibited by these users will likely yield different and often inconsistent images. These factors further reduce the attractiveness of using a QBIC system.

Another conventional technique for automating image classification and retrieval uses, e.g., so-called "eigenimages" which are mathematical techniques for clustering vectors in space. An additional technique known in the art measures a distribution of colors, in terms of a histogrammed frequency of occurrence across a query image and for an entire color gamut. This histogrammed distribution is also measured for each image in an image database, with a distance measure then used to compare the histogrammed results between each database image and the query image. The database image possessing the smallest distance measure is presented to the user as a retrieved image. Each of these two alternate techniques suffers the same infirmity inherent in a QBIC system; namely, for a user, it is both labor and time intensive. Specifically, both of these systems exhibit insufficient resolution, which, in turn, often yields a large group of retrieved images that a user must individually review in seriatim.

Thus, an acute need still remains in the art for an effective automated image classification and retrieval system. Such a system should not be either time or labor intensive for an individual to learn, much less use. In that regard, the system should classify images with sufficient resolution so as to reduce the number of retrieved images presented to a user at any one time. The system should also not require a user to specify any desired image features or set any numeric weights thereof. Additionally, the system should substantially eliminate user induced subjectivity and produce highly consistent results, in terms of the images retrieved, across different users.

SUMMARY OF THE INVENTION

The present invention satisfies this need and, in so doing, advantageously eliminates the deficiencies inherent in conventional image classification and retrieval techniques.

In accordance with the present invention, which utilizes a query by example paradigm, a user supplies a group of so-called query images in which each image is structurally similar to those additional images (s)he desires. Then, the invention, through a mathematical assessment of visual similarity using a substantial number of different pre-defined visual characteristics of the query images, taken collectively, against each image in an image database and using an inverse variance based measure, returns, as its results the image(s) in the database that is most similar to the query images.

Specifically, through my invention, a signature is generated for each query image. Each such image can reside on a database or be externally supplied. For each such image, its signature is generated by iterative multi-level convolution filtering of pixel values for each color axis of that image. At each level, incoming pixel values are applied to a convolution filter and are separately convolved with each one of a set of, e.g., predefined derivatives of Gaussian kernels, with the resultant pixel values then being squared to yield an output image. The output image is either supplied as input to the next filtering level or its pixel values are summed. This sum becomes the value of a corresponding element in the signature. For illustratively three filtering levels with, e.g., 25 kernels applied at each level, values of $25^3$ (or 15,625) different visual characteristics result for each color axis in the query image. Once a signature has been generated for each query image, statistic vectors, illustratively having average and variance measures, are separately computed across corresponding elements and for each color axis, in all the query image signatures. These vectors mathematically describe the query images taken collectively.

Once these vectors are computed, then the signature of each image, i.e. as a so-called "test" image, having a signature referred to as a "test" signature, in the database is compared against the average and variance vectors. During comparison operations, the average and variance vectors remain fixed. A "similarity" measure, being a numeric measure reflective of the relative similarity between the test image and between all the query images viewed collectively, is computed as typically a function of a sum, across all the vector elements and for all the color axes, of the difference between the corresponding elements in the average and test signature vectors divided by the corresponding element in the variance vector.

Since the image characteristics are all pre-defined and fixed, then, the signature of each test image may be precomputed, i.e. computed and stored for use during a subsequent image retrieval operation—which is likely to save significant processing time during a retrieval operation, or may be computed as needed for immediate use for comparison purposes. Based upon user specification, a certain number of images, such as five or ten, that have the largest similarity measures are then rank-ordered, in terms of descending similarity, and presented for display to the user for either acceptance or rejection.

My invention advantageously eliminates a need for the user to have any prior knowledge of any visual characteristic used to classify an image and hence renders the search and retrieval operations essentially independent of the user. Similarity among query images and between query and test images is determined substantially, if not totally, independent of the user. As such, the present invention advantageously eliminates any need for the user to weight any image characteristic vis-a-vis other such characteristics. Not only does this greatly relieve the burden on the user but also it substantially, if not totally, reduces any user induced subjectivity in retrieval operations, thus returning consistent results across an entire user community.

As a feature, the present invention allows a user to refine the retrieval process to locate images of increased relevance to the query images. Specifically, any retrieved image can be applied as a additional query image. In this case, the average and variance vectors will be updated to account for the signature for this new query image, and the entire retrieval process repeated.

Furthermore, as another feature of the invention, once a signature has been calculated for an image, whether it is a query or test image, that signature can be stored for further use thereby obviating the need to re-calculate the signature of that image during a retrieval operation, and hence substantially reduce attendant processing time for retrieval.

Moreover, query signatures can be grouped together and indexed with a common linguistic (or other) term that is descriptive, e.g. semantically, of the entire group of images. This allows a textual, rather than just mathematical, vocabulary to be built to define a group of images and permit easy retrieval, through a textual database search, of the signatures of this group for use during a subsequent retrieval.

As a further feature of the invention, not only can the signature of each image residing in an image database be stored for subsequent use, but also so too can the average and variance vectors for any group of images. These vectors can be precomputed for a given group of images, stored within a database, and then, at some time later accessed and directly compared against each signature in the database to yield an associated similarity measure. As with storage of precomputed signatures, storage and utilization of precomputed average and variance vectors advantageously eliminates any need to directly process images during a retrieval operation. This further reduces processing time over merely storing complete signatures inasmuch as average and variance statistics for a group of signatures need not be calculated during a retrieval operation.

As such, a user can apply a class of related images of a unitary semantic concept to the invention, provide, e.g., a linguistic description, by way of one or more terms or keywords, and have the images stored, and the signatures and average and variance vectors computed therefor and, along with the accompanying description, stored for this image class (group) for future use. These vectors form a mathematical based semantic description of this image class. In addition, the class can be readily supplemented later with an additional image(s). In this case, the average and variance vectors would be updated to account for the additional image. As additional images are added to any class and the vectors updated accordingly, these vectors advantageously become increasingly robust and discriminating descriptors of that class.

BRIEF DESCRIPTION OF THE DRAWINGS

The teachings of the present invention can be readily understood by considering the following detailed description in conjunction with the accompanying drawings, in which:

FIG. 7 depicts a block diagram of signature computation engine 410 shown in FIG. 4;

FIG. 8 depicts the proper alignment of the drawing sheets for FIGS. 8A and 8B;

FIGS. 8A and 8B collectively depict a flowchart of signature computation process 800 which is performed by computation engine 410;

FIGS. 10A and 10B, 11A and 11B, and 12A and 12B pictorially depict first, second and third pairs, respectively, of a group of exemplary query images into a pre-defined image database, and a corresponding group of resulting search images as retrieved from that database and as produced through use of the present invention, respectively.

To facilitate understanding, identical reference numerals have been used, where possible, to designate identical elements that are common to the figures.

DETAILED DESCRIPTION

After considering the following description, those skilled in the art will clearly realize that the teachings of my invention can be readily utilized in substantially any image retrieval system to locate a desired image(s), regardless of the semantic content of the images sought or searched. For example, the invention can find use in automating search and retrieval aspects of a so-called "photo shop" where one image or a group of images that share a common semantic theme are retrieved from a generalized image database that stores a multitude of unrelated digitized images, and/or of a specialized image library, such as in retrieving a particular image or group thereof from a collection of highly related images, such as digitized medical X-ray or CAT scan images. To simplify and facilitate reader understanding, I will describe my invention in the context of use in conjunction with a "photo shop" type image retrieval application.

In essence, my invention utilizes a query by example paradigm. With this paradigm, a user supplies a group of so-called query images in which each image is visually similar to those additional images (s)he desires. Then, my invention, through a mathematical assessment of visual similarity using a substantial number of different pre-defined visual characteristics of the query images, taken collectively, against each image in an image database and using an inverse variance based measure, returns, as its results and without human intervention such as through, e.g., setting weights and the like, the image(s) in the database that is most similar to the query images. Advantageously, my invention renders the search and retrieval operations totally independent of the user, thus advantageously eliminating a need for the user to have any prior knowledge of any characteristic used to classify an image, let alone weight that characteristic vis-a-vis other such characteristics.

In accordance with my inventive teachings, to assess visual similarity between a group of query images and each image in the image database, it is first necessary to quantitatively measure the presence of each visual characteristic (feature) in each query image and determine just those particular visual characteristics that accurately and collectively describe the entire group of query images. These particular characteristics, both in terms of those which exist in these images and their quantitative measures relative to each other (i.e. an implicit ranking or weighting), describe the query images taken as a whole. Once this subset has been so defined, then a resulting image(s) that is ultimately retrieved from the database and presented to the user is that which possesses visual characteristics that are the most similar, in terms of the characteristics that are present and their values, to those in the group of query images, and hence should be a member of the same image subset that contains the query images.

Figure 1:
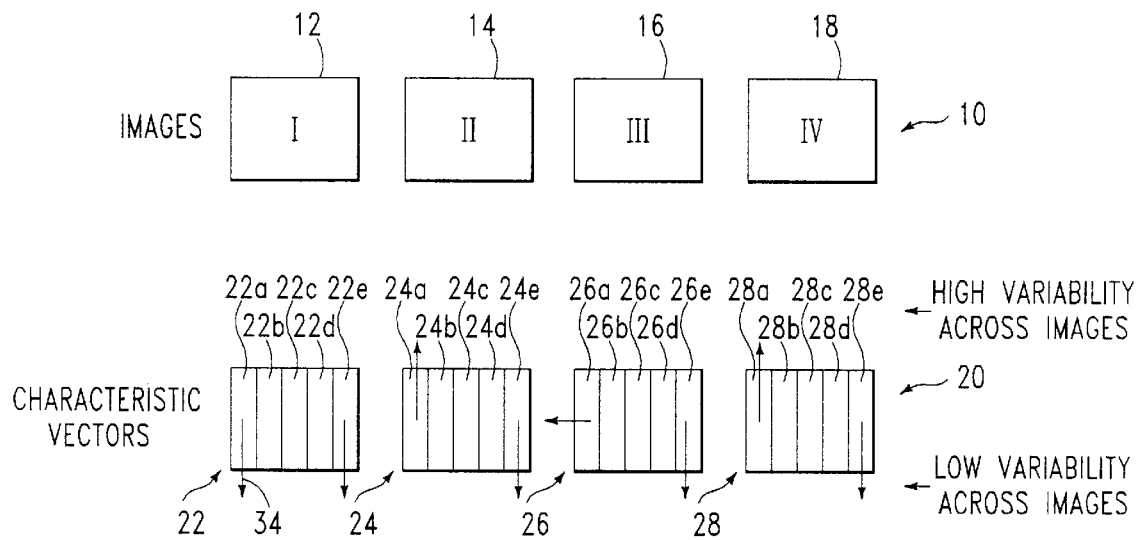
FIG. 1 depicts illustrative characteristic vectors and variability therebetween for a series of corresponding images.

Consider FIG. 1 which depicts illustrative characteristic vectors and variability therebetween for a group of corresponding query images. Here, illustrative query image group 10 contains four query images 12, 14, 16 and 18 (also labeled as images I, II, III and IV, respectively)—the actual visual content of each of these images is immaterial. Each image in the group can be classified according to a plurality of pre-defined fixed image characteristics, here illustratively characteristics a, b, c, d and e (not explicitly shown). Ignoring, for the moment, just what exact visual attribute is delineated by each characteristic, let us assume that these five such characteristics are used to classify each and every image and each such characteristic specifies a different corresponding visual attribute of an image. For every image, the measurement of each of its five characteristics (a, b, c, d and e) forms a characteristic vector for that image, with the measured value of each characteristic placed in a corresponding element of the vector. In that regard, characteristic vectors 22, 24, 26 and 28 are associated with images 12, 14, 16 and 18, respectively, and contain respective elements $22a, 22b, 22c, 22d$ and $22e$; $24a, 24b, 24c, 24d$ and $24e$; $26a, 26b, 26c, 26d$ and $26e$; and $28a, 28b, 28c, 28d$ and $28e$.

As depicted by corresponding arrows, of which arrow 34 is illustrative, image 12 contains two characteristics (a and e), having values residing in elements $22a$ and $22e$, that are relatively low in value. Image 14 contains relatively high and low values of characteristic a and e, residing in elements $24a$ and $24e$, respectively, of vector 24. Image 16 contains relatively moderate and low values of characteristics a and e, respectively, residing in elements $26a$ and $26e$ of vector 26. Lastly, image 18 contains relatively high and low values of characteristics a and e, respectively, residing in elements $28a$ and $28e$ of vector 28.

Those characteristics which exhibit relatively low variability across all the query images, such as characteristic e—which is relatively low in each of the query images, are accurate descriptors of the group of query images. In sharp contrast, characteristics, such as characteristic a, which have a relatively high variability across all the query images are a rather poor descriptor of that group. Consequently, each of those images in the image database that possess low values of characteristic e are more likely to be similar to the query images and hence is a likely candidate for inclusion in the same image subset that contains the group of query images. Through my inventive teachings, a variance based measure, as described in detail below, is used to assess whether an image is sufficiently similar to the group of query images as to be included in the subset thereof and so returned to the user.

In order to provide sufficient resolution to classify images with relatively fine content and yet accurately discriminate among individual images in a massive image database, my inventive image classification and retrieval technique utilizes a substantial number of different visual characteristics. As contrasted with conventional image retrieval techniques, such as QBIC, that use only 5–10 characteristics which mimic those visual attributes with which humans use in recognizing an image, but which also provide grossly inadequate resolution, my inventive technique is not so constrained. In sharp contrast, and as described below, my inventive technique uses illustratively $25^3$ different characteristics (which equals 15,625) (as discussed in considerable detail below) for each color axis (e.g. additive three-color space: red, green and blue) in the image, for a total of, e.g., $3 \times 25^3$ or 46,875 such characteristics for each image. If color spaces with more than three axes (such as, e.g., subtractive four-color space: cyan, magenta, yellow, black), then the number of characteristics linearly varies accordingly. By isolating a user from a need to have any knowledge of, much less weight, or even interact with any of these characteristics, my invention utilizes levels of increasingly abstract mathematically-based characteristics that have no direct mapping to any verbally describable image feature, but provide substantially enhanced resolution over that heretofore attained in the art.

Before proceeding to an in-depth discussion of those image characteristics used in my invention —which are discussed below in conjunction with FIGS. 6, 7 and 8A–8B, to facilitate reader understanding, I will now address high-level aspects of my invention, in terms of its overall implementation and in the underlying software.

Figure 2:
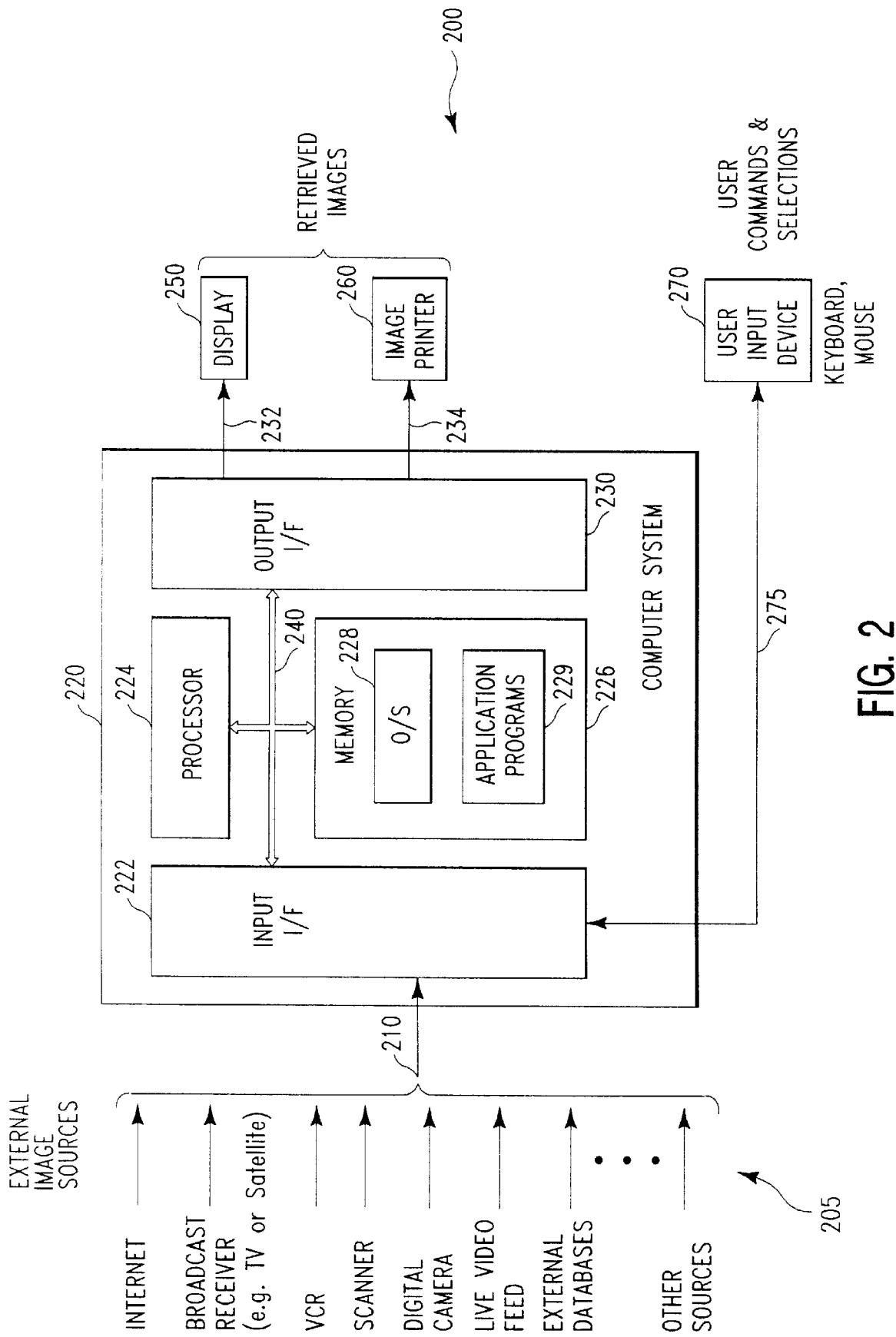
FIG. 2 depicts a high-level block diagram of system 200 that implements the present invention.

FIG. 2 depicts a high-level block diagram of system 200 that implements the present invention. As shown, this system contains computer system 220 which itself comprises input interface (I/F) 222, processor 224, memory 226 and output interface 230, all conventionally interconnected by bus 240. Memory 226, which generally includes different modalities (all of which are not specifically shown for simplicity) illustratively random access memory (RAM) and hard disk storage, stores operating system (O/S) 228 and application programs 229. O/S 228 may illustratively constitute the WINDOWS NT operating system presently available from the Microsoft Corporation of Redmond, Washington (WINDOWS NT is a registered trademark of the Microsoft Corporation). The specific software modules that implement the inventive image classification and retrieval system reside within application programs 229.

Incoming images are provided to system 200, via input path 210, through a wide variety of sources—all of which are collectively referenced as sources 205. These sources, of which only a few are specifically shown, illustratively include: images provided through an Internet connection, from a broadcast receiver (such as a television or satellite receiver), from a video cassette recorder (VCR) or a digital camera, from a live video feed(s), from an external database (s), and/or from a document scanner. Inasmuch as my invention will function with images regardless of their source, the particular modality through which any such image is physically provided to system 200 is immaterial. Input interface 222 is connected to path 210 and contains appropriate circuitry to provide the necessary and corresponding connection, e.g. modem or network interfaces for Internet access, required to physically connect and interface each differing source of incoming digitized images to computer system 220. In addition, input interface 222 connects and interfaces user input device 270, such as a keyboard and mouse, to computer system 220. Display 250, such a conventional color monitor, and image printer 260, such as a conventional color laser printer or other well-known color printer, are connected, via leads 232 and 234, respectively, to output interface 230. Output interface 230 provides requisite circuitry to electrically connect and interface display 250 and printer 260 to computer system 220.

In operation, once an incoming image (from whatever source) is applied to system 220 and stored therein as part of an image database residing within memory 226 and typically within hard disk storage therein (though not specifically shown), that image is eventually processed by processor 224 under control of application programs 229 and specifically those software modules, as discussed below, that implement the inventive image classification and retrieval system. O/S 228 can be configured to continuously execute these application programs such that system 220 will automatically accept and classify new images as they are applied to system 220 from any one of sources 205.

A user can also invoke the present invention, through appropriate commands entered via device 270 and in response to a program icon appearing on display 250, to either classify a new image which the user will provide to system 200 and/or retrieve a desired image(s) from the image database.

Should the user invoke an image retrieval function, then that user will supply a set of query images, which can be images that are either already stored within the image database or are not, from any image input source, via path 210, to system 220. That system will then, in an inventive manner as discussed in considerable detail below, retrieve an image(s) from all those stored in the image database and which is the most similar to the query images, taken collectively, and display that image on display 250. The user, through user input device 270, can either select that particular image for saving via, e.g., printing through printer 260, or some other mechanism that provides persistent storage, or reject that image in favor of retrieving another similar image, and so forth.

Inasmuch as the specific hardware components of computer system 220 as well as all aspects of the software stored within memory 226, apart from those modules that implement the present invention, are conventional and well-known, they will not be discussed in any further detail.

Figure 3:
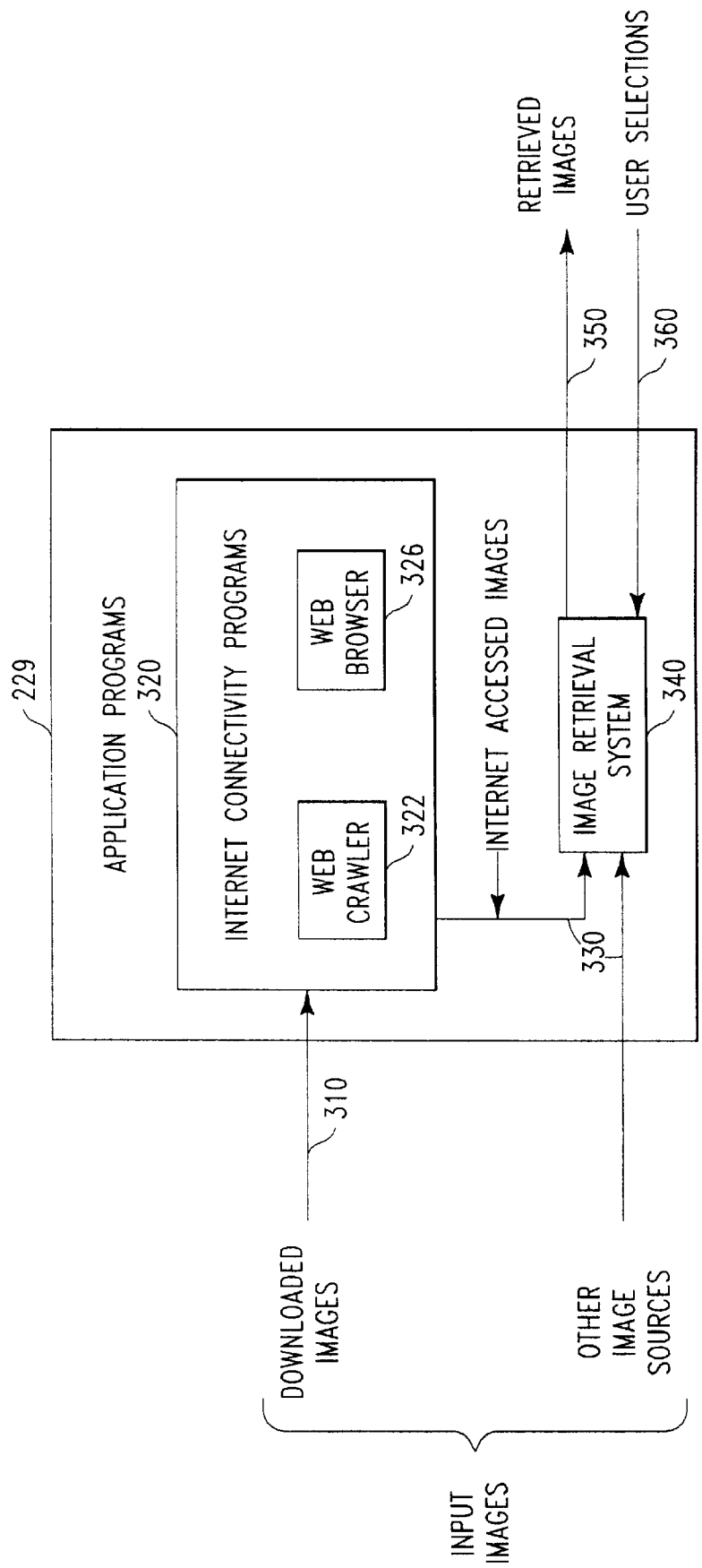
FIG. 3 depicts a high-level block diagram of application programs 229 that execute within system 200.

FIG. 3 depicts a high-level block diagram of application programs 229 that execute within system 200. As shown and in pertinent portion, these programs include Internet connectivity programs 320 and inventive image retrieval system 340. Programs 320, which are conventional, include web crawler 322 and web browser 326. If, as noted above, the operating system is configured such that the inventive retrieval and classification system automatically classifies incoming images, as they arrive, web crawler 322 can be used to search, on an automated basis, the Internet, on a site-by-site basis progressing through the net, to download available images and accompanying text. Browser 326 can be used by a user stationed at computer system 220 (see FIG. 2) to manually search desired Internet sites and download images and textual material the user has found of interest. Images obtained through programs 320 are routed, via paths 330, along with images provided from other sources, to inventive image retrieval system 340. This system applies retrieved digitized images to output path 350 and accepts selections, and other user based input, via path 360. Paths 310, 330, 350 and 360 are all software-defined, as contrasted with leads 232 and 234 shown in FIG. 2 which are physical connections. Inasmuch as all the intervening software and/or hardware components for interfacing these software-defined paths to the actual hardware shown in FIG. 2 are readily apparent to those skilled in the art and do not form part of the present invention, then, for simplicity, these components have all been omitted and will not be addressed hereinafter.

Figure 5:
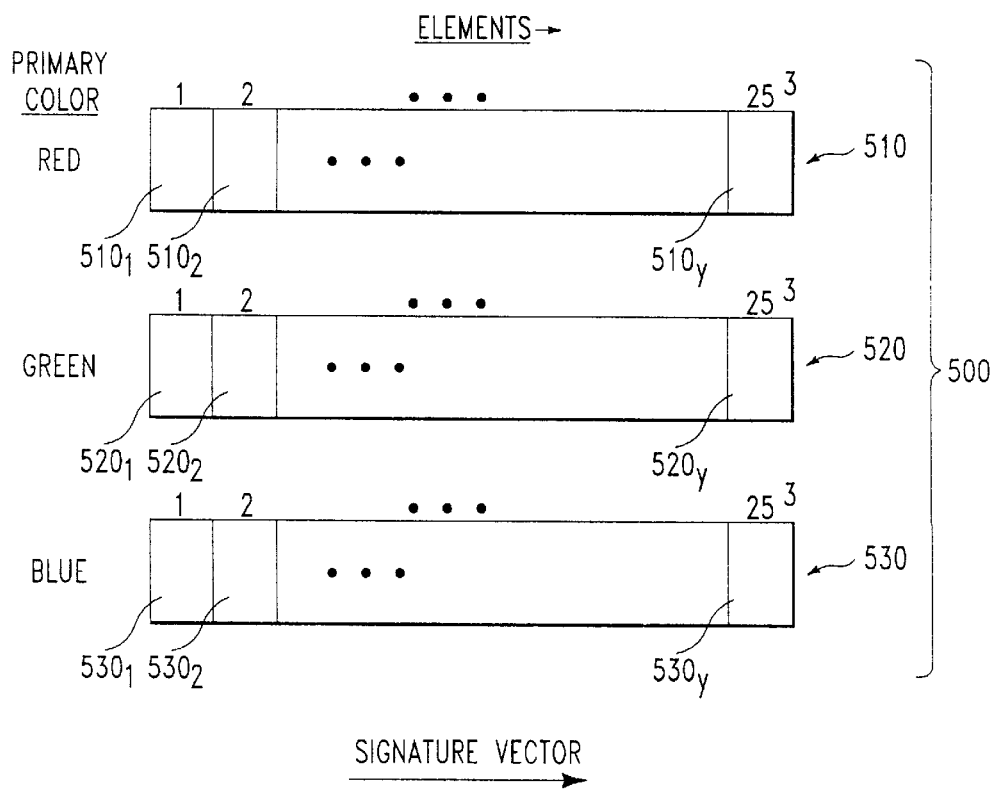
FIG. 5 depicts the organization and constituent fields of illustrative signature vector 500.
Figure 4:
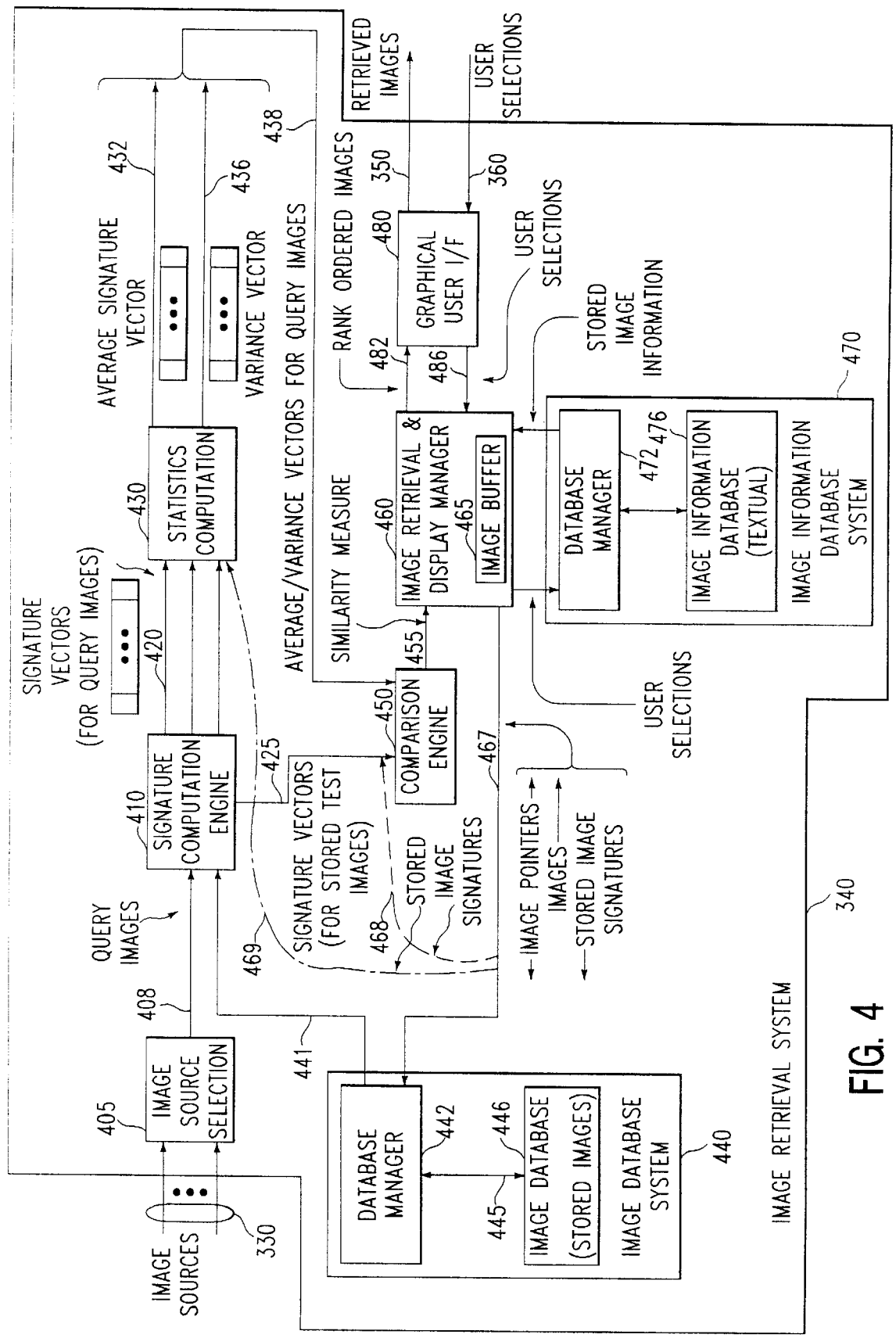
FIG. 4 depicts a block diagram of one embodiment of inventive image retrieval system 340 that forms part of application programs 229 shown in FIG. 3.

FIG. 4 depicts a block diagram of one embodiment of inventive image retrieval system 340 that forms part of application programs 229 shown in FIG. 3. FIG. 5 depicts the organization and constituent fields of an illustrative signature vector. The reader should simultaneously refer to both FIGS. 4 and 5 throughout the following discussion.

To fully elucidate the present invention, it is worthwhile to first provide a general overview of my inventive image processing methodology before delving into the specifics shown in this figure.

In particular and as alluded to above, each query image is first classified. During the course of doing so, a signature vector (for brevity hereinafter referred to as just a "signature"), such as signature 500, is fabricated for that image. Each axis in the color space for each image is classified by illustratively $25^3$ different characteristics. As such, for the illustrative red, green, blue (RGB) color space, this vector has three sub-vectors 510, 520 and 530 for red, green and blue respectively, each of the sub vectors containing a field for a value of each such characteristic for that color axis. For simplicity, the RGB color space will be assumed hereinafter. Accordingly, each sub-vector contains $25^3$ (equaling 15,625) fields. Illustratively, sub-vector 510 contains fields $510_1, 510_2, \ldots, 510_y$; sub-vector 520 contains fields $520_1, 520_2, \ldots, 520_y$; and sub-vector 530 contains fields $530_1, 530_2, \ldots, 530_y$ (where y equals 15,625). A complete signature for each different RGB image contains three constituent sub-vectors for a total of $3 \times 25^3$ (or 46,875) fields.

Once a signature has been fabricated for all the query images, statistics are computed across all these signatures. The resulting statistics, which collectively describe all the query images, constitute an average signature vector and a variance vector (for each color axis in the color space of the input image). Each individual element in the average and variance vectors are the average and variance, respectively, of the same corresponding elements (i.e. those which have same index) across the signatures for all the different query images. Once the average and variance vectors are computed, then the signature of each image, i.e. as a so-called "test" image having a signature referred to as a "test" signature, in the image database is compared against the average and variance vectors. During comparison operations, the average and variance vectors remain fixed. In that regard, a "similarity" measure is computed as typically a function of a sum, across all the vector elements and for all the color axes (e.g., R, G and B), of the difference between the corresponding elements in the average and test signature vectors divided by the corresponding element in the variance vector. Inasmuch as the image characteristics which I use are all pre-defined and fixed, then, the signature of each test image may be precomputed, i.e. computed and stored for use during a subsequent image retrieval operation—which is likely to save significant processing time during a retrieval operation, or may be computed as needed for immediate use for comparison purposes. Based upon user specification, a certain number of images, such as five or ten, that have the largest similarity measures are then rank-ordered, in terms of descending similarity, and presented for display to the user for either acceptance or rejection.

In sharp contrast with conventional image retrieval systems, my inventive system relies on automatically computing the similarity measure without any user intervention, such as in setting weights or the like. This, in turn, advantageously permits my inventive system to utilize an extremely large and diverse set of, e.g., increasingly abstract, image characteristics which are far in excess of that heretofore possible and thereby achieve excellent search resolution through massive number of image files.

With the above in mind and returning to FIG. 4, inventive system 340 contains image source selection block 405, signature computation engine 410, statistics computation block 430, image database system 440, comparison engine 450, image retrieval and display manager 460, image information database system 470 and graphical user interface (GUI) 480.

Incoming images from various sources are routed, via paths 330, to image source selection block 405. This block, based upon prior user input, selects one of the image sources. To simplify matters, let us assume for the moment that the user is providing a succession of query images, in seriatim (i.e. a "set" or group of such images), to the system. Each query image generated by the selected source is then routed through block 405, via path 408, to signature computation engine 410. This engine computes, through an iterative multi-level convolution based filtering operation (as discussed in detail below), the complete signature for that query image. Once all the signatures for all the query images have been fabricated, as symbolized by lines 420, statistics computation block 430 computes the average and variance vectors for all the query image signatures. As noted above, the average and variance vectors are simply formed of the average and variance on an element-by element basis across all corresponding elements of all the query image signatures, with separate average and variance sub-vectors for each color axis. Although only one sub-vector is specifically shown for each of the average and variance vectors, each of these vectors contains three sub-vectors, one for each color axis, in the RGB color space, in the same manner as does an image signature. Hence, the average and variance vectors each illustratively contains $3 \times 25^3$ (or 46,875) elements.

Once the average and variance vectors are computed for all the query images in the set, these vectors are routed via paths 432, 436 and 438, to one input of comparison engine 450. At this point, image retrieval and display manager 460 instructs, via path 467, image database system 440, and specifically database manager 442 therein, to access a first image stored within image database 446. Database manager 442 can be any conventional database manager designed to manipulate a database of stored images. Illustratively, these stored images can be individual frames that collectively form a motion picture or other video program. In any event, once this first image is accessed, this image is routed as a "test" image, by database manager 442, via path 441, to signature computation engine 410. Signature computation engine 410 computes a complete signature for this test image. This signature is computed in the exact same manner as accomplished for each query image. Once the first test image signature has been computed, it is routed, via path 425, to a second input of comparison engine 450 and also, via manager 460, for storage within database 476. In addition, image database 446 also stores a pointer to the each full image stored therein for use in subsequently accessing and/or identifying that image. Accordingly, a pointer to the accessed first test image is routed by database manager 442 to image retrieval and display manager 460 for temporary storage within database 476.

Comparison engine 450 compares the first test image signature against the average and variance vectors and produces a similarity measure. The higher the numerical value of this measure is, then the closer the test image, in terms of the presence and prevalence in the test image of the pre-defined characteristics in the query images weighted by the query-variance, is to the query images. This measure is applied, via path 455, to image retrieval and display manager 460 for local storage. Manager 460 forms an association between the similarity measure then incoming from path 455 and the pointer, provided by database manager 442, to the first test image, and then stores both of the items temporarily as a common entry within a local file (not specifically shown). Once the entry for the first test image is stored, manager 460 then instructs database manager 442, via path 467, to access the next successive image stored within image database 446 as a second test image. The signature for this second test image and its resulting similarity measure are then successively calculated and temporarily stored, within database 476, along with the corresponding pointer to this particular test image, and so forth for every other image within database 446. Manager 460 locally stores the entries ranked in terms of descending similarity measures within image information database system 470. This database system is managed by database manager 472.

After all the images stored within image database 446 have been processed as "test" images with corresponding signatures and similarity measures generated therefor and stored within database 476, image retrieval and display manager accesses, via manager 472 and from database 476, the pointers for a group of images that have the highest similarity measures and are to be displayed as "retrieved" images. The number of images in this group is predefined, such as illustratively five or ten images, with this number either being a default value or over-ridden by user specification. The retrieved images are either presented to the user sequentially, in terms of decreasing similarity measure, for manual acceptance or rejection by the user. To accomplish this, manager 460 queries, via manager 472, database 476 for the entries for the group of images with the highest similarity measures. The resulting pointers to each image in the group returned by database manager 472 is then passed, via manager 460, back, via path 467, to image database system 440. There, database manager 442 accesses each of these particular images and routes it, in its entirety, to manager 460. The manager then, through GUI 480, displays this image on the display monitor and solicits input from the user. The user, through his(her) selection(s) applied to system 340 can either accept this image, i.e. signify that the retrieval is complete, or have the next retrieved image in succession, i.e. that having the next highest similarity measure, accessed and displayed. Alternatively, the user can instruct manager 460 to simultaneously display all or some of the retrieved images in a non-overlapping fashion on the monitor. In this instance, manager 460 will successively access each such retrieved image from image database system 440, and, once all such images have been obtained, then, assemble and paint, through GUI 480, an appropriate image display, containing all these images, on the monitor.

To facilitate understanding, image database 446 and image information database 476 are shown as separate databases. Clearly, these databases can be combined into one common database. Furthermore, image database 446, while shown as part of image retrieval system 340, can be sited on a server, such as a single Internet server, or even distributed over a plurality of Internet and/or other servers, all or most of which are remote from system 340. Furthermore, the pointer for each image can be a so-called "URL" (uniform resource locator) to an Internet location where that image is stored.

To refine the retrieval process, the user can also instruct the image retrieval and display manager to use any retrieved image as a additional query image in order to refine a subsequent retrieval operation for that query. In this case, the average and variance vectors will be updated to account for the signature for this new query image, and the entire retrieval process repeated.

In particular, this additional image, particularly its signature, can be added to an existing group of query images—as symbolized by, e.g., dashed line 469 in FIG. 4. Once this occurs, the average and variance vectors would be recomputed and updated to take into account all the query images, including the additional image. The resulting updated average and variance vectors would then be used during subsequent retrieval. In this manner, as the system retrieves images of increasing interest and relevance to a user, that user can iteratively and increasingly refine the query to locate any such images that are likely to be of even further interest. In a similar manner, rather than just adding an image(s) (or it signature(s)) to a group of query images, the user, though suitable instructions provided to manager 460, can edit the group, either once or iteratively as often as desired, by deleting a image from the group and/or substituting a newly retrieved image for one of lesser interest in the group, and repeating the retrieval process. All such edits will further refine the group of query images and hence the ensuing retrieval operation based thereon. Through such interactivity, the user can very effectively guide the inventive system in locating and retrieving an image(s), from those stored within database 446, that, semantically speaking, is increasingly closer to that desired by the user and in less time than might otherwise occur, while avoiding the retrieval of images that are only tangentially relevant.

To significantly increase retrieval speed, image signatures can be pre-computed for each image within image database 446 and stored, along with its associated image pointer, within database 476. Under this scenario, each stored signature rather than an entire image will be accessed, with the accessed signature applied, as symbolized by dashed path 468, directly to comparison engine 450 for comparison with the average and variance vectors. Inasmuch as a signature comparison, as discussed below, consumes substantially fewer calculations than those required to generate a complete signature, significant reductions in retrieval time will result through signature pre-computing and storage. As an aside, the similarity between any two different images can be readily determined by comparing their two signatures and determining a value, such as an inverse of summed absolute differences between corresponding elements in and across both signatures, representative of a degree of similarity therebetween. As the value increases for any pair of images relative to that for other image pairs, so does the similarity of the former over the latter.

Prior to proceeding with a detailed discussion of signature computation engine 410, to simplify understanding, I will digress somewhat and address convolution, including compound and particularly half-level convolution kernels, as used in the present invention.

A given visual characteristic in an image can be measured by convolving that image with a corresponding convolution kernel, in which that kernel has been specifically defined to detect that characteristic. For example, by convolving an input image by a kernel, typically in pictorial form (–⊕), designed to detect edges, a resulting response image will predominantly contain the edges depicted in the original image but not areas of constant tone. Different characteristics, such as the presence of horizontal lines, vertical lines, diagonal lines and others, can be detected and hence different response images will result from separately convolving the input image with different predefined kernels appropriate for detecting each one of these different characteristics. By convolving an image with certain kernels, substantially all the frequency information, particularly the low frequency information, will be preserved in the response image. This frequency preservation also occurs with a one-half down-sizing convolution, e.g. where every other, rather than every, neighborhood in an input image is convolved. Through such downsizing, the convolved response image will be one-fourth the size of the input image (reduced by one-half in both the vertical and horizontal directions) but will contain substantially all the frequency information, and particularly the low frequency information, carried by the input image and the kernel.

With this in mind, I have recognized that since convolution with certain kernels preserves substantially all the frequency information of a specific type associated with the nature of the kernel residing in an input image in a response image, then additional image characteristics in the input image can be detected by iteratively convolving that image, each time with a set of kernels. In that regard, an input image can be convolved with a first set of kernels to produce a first level response image which itself, in turn, can be convolved with a second set of kernels, and so forth, to produce an exponentially larger number of different, increasingly abstract, image characteristics. For example, if a set of illustratively 25 unique kernels is used at each level, then with three iterative levels of convolution, $25^3$ (15,625) different image characteristics will occur. Though a different set of kernels can be used at each level, for simplicity, the same set is preferably used at each level. A three-level iterative convolution performed over three different color axes in the input image (here R, G and B) will yield a total of $3 \times 25^3$ (46,875) different image characteristics. Such a massive number of different visual characteristics can advantageously provide sufficient resolution to accurately search for a single desired image across a massive number of different images. I have found that increasing the number of iterations past three yields relatively little useful information content at the expense of a substantial increase in a number of required computations. In addition, the number of kernels used at each level is not critical provided a large enough number (K) is used such that based on the number (L) of iterative convolution levels used, a sufficiently large number ($K^L$) of different image characteristics results for each different color axis to provide satisfactory resolution for retrieval.

Figure 6:
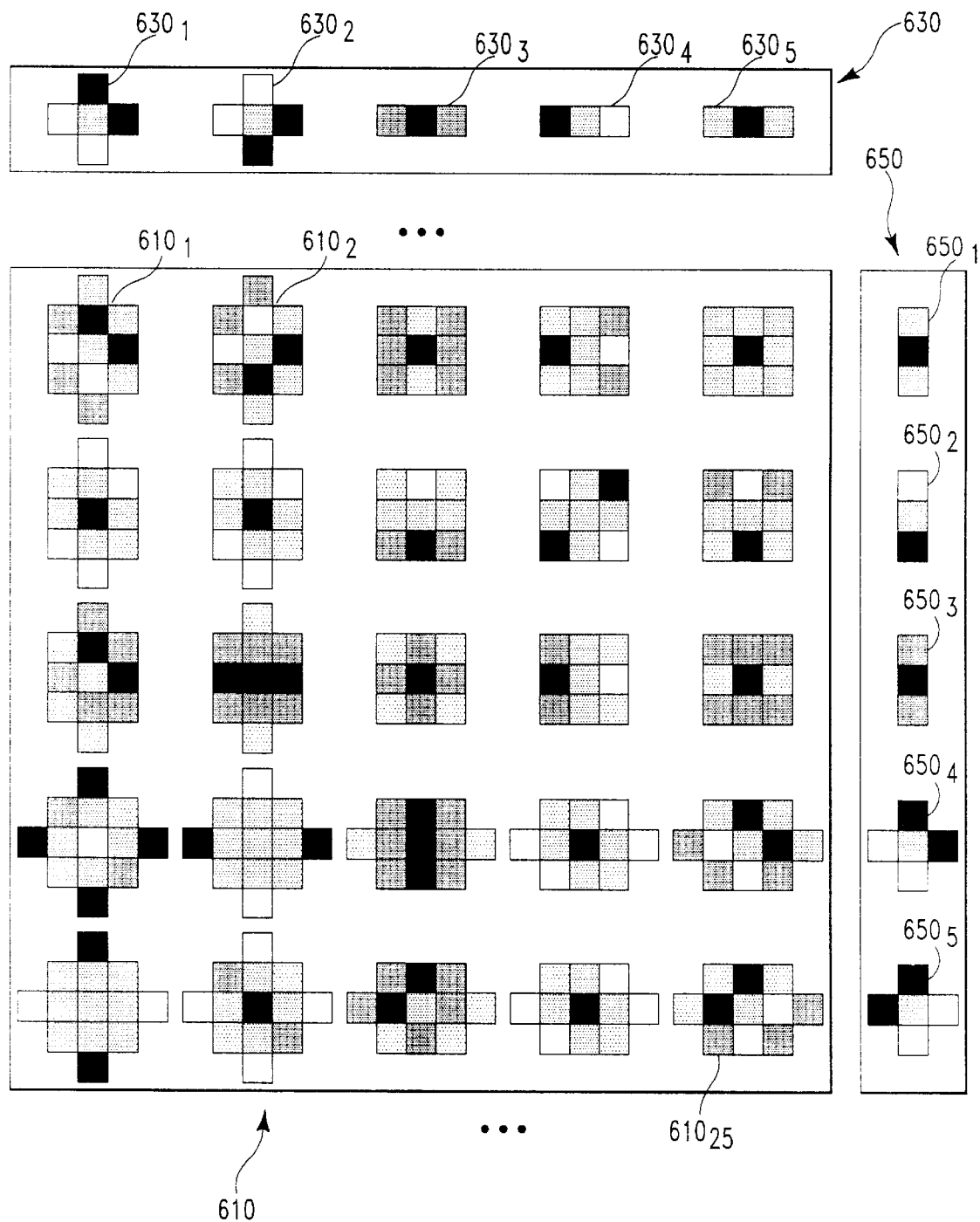
FIG. 6 depicts, in pictorial form, compound and half-level kernels, the latter used in conjunction with iterative convolution filters 710 shown in FIG. 7.

Furthermore, in accordance with my invention, the convolution kernels used at each level are derivatives of so-called Gaussian kernels and specifically of two-dimensional derivatives of Gaussian kernels. In general and as known in the art, a derivative of a Gaussian function has excellent information carrying properties. It is well known that such a function can be well modeled by small kernels, such as matrices illustratively 3×3, or 5×5 in size. See, e.g., W. T. Freeman et at, "The Design and Use of Steerable Filters", IEEE Transactions on Pattern Analysis and Machine Intelligence, Vol. 13, No. 9, September 1991, p. 891–906. As long as a complete set of such kernels is used, then a convolved response image can accurately and efficiently reproduce substantially all the information content in an input image. As per my inventive teachings, to fabricate a set of illustratively 25 two-dimensional kernels, two sets of one-dimensional derivatives of Gaussian functions are formed. Both sets are identical with each containing five members. Each function set consists of, in order, e.g., a single low-pass Gaussian filter function, its first derivative, its second derivative and the first derivative oriented at separately 45 and 135 degree orientations. Clearly, other Gaussian-based function sets can be used. To form two-dimensional Gaussian functions, the two 1×5 Gaussian function sets, viewed as matrices, are multiplied together to yield 25 separate two-dimensional products. Each of the resulting products is then accurately modeled by a so-called "compound" (two-dimensional) kernel. A depiction of the 25 illustrative compound kernels used in the present invention is shown in FIG. 6 as kernels 610, which specifically includes kernels $610_1$, $610_2$, ..., $610_{25}$.

A convolution operation involving a kernel involves separate multiplications. My present invention requires over 45,000 convolution operations to be performed on each image to yield a signature therefor with each convolution necessitating n×m×r×s computations, where n and m represent the image size, and r and s the kernel size. Though my invention will properly function with substantially any size image and kernel, given the tradeoffs in useful image size vis-a-vis computations required, I have chosen to use input images having 256×256 pixels in size, 3×3 sized kernels and 25 different compound kernels.

Apart from these selections as to image size and kernels, the number of required computations, and hence the processing time to generate a signature for an image, can both be drastically reduced through two techniques.

First, a two-dimensional convolution with a compound 3×3 kernel can yield the same results as two separate and successive one-dimensional convolution operations with corresponding half-level kernels: one convolution in the horizontal direction with a 1×3 half-level kernel and the other in the vertical direction with a 3×1 half-level kernel, where the compound 3×3 kernel is separated into these two half-level kernels. This reduces the required number of computations for each kernel operation from $O(N^2)$ to $O(2N)$ (where N is a number of separate elements in the kernel), which here with 3×3 sized kernels equates to a reduction from nine to six computations per kernel operation.

In particular, as used in the present invention, each of compound kernels 610 is separated into one of five half-level kernels 630 and an associated one of half-level kernels 650. To easily discern the appropriate pair of half-level kernels for each compound kernel, I have arranged in FIG. 6 half-level kernels 630 and 650 above and to the right, respectively, of a matrix of compound kernels 610. The particular row and column position of any of the compound kernels, within the matrix, defines the particular one of half-level kernels 650 and the particular one of half-level kernels 630, respectively, that are separated from that compound kernel. For example, illustrative compound kernels $610_1$ and $610_2$ are separated into pairs of half-level kernels $630_1$ and $650_1$, and $630_2$ and $650_2$, respectively, and so forth for the remaining compound kernels.

Second, to further and drastically reduce the number of required computations, rather than repeating entire convolution operations for each and every level that have been previously calculated, intermediate results for each level are stored and reused for computations at other levels. This advantageously eliminates a need to recompute identical convolutions. Such convolutions occur by virtue of using the same set of kernels at different levels. In the absence of these two techniques, computing a signature for a single 256×256 image would require on the order of 600 Billion operations. By reusing intermediate results, this number is reduced to approximately 11 Billion operations/image. Through use of separable half-level rather than compound convolution kernels, the required number of computations for the same 256×256 image is advantageously further reduced to approximately 1.1 Billion —which can be performed within 1½ minutes (or less) on a standard commercially available PENTIUM-class personal computer (PENTIUM is a registered trademark of the Intel Corporation), thus rendering the task of computing a signature for every image in a database quite feasible.

With the above description in mind, I will address signature computation engine 410, which is depicted in block diagram form in FIG. 7 on a "snapshot" basis to yield a single signature vector element.

As shown, engine 410 contains iterative convolution filters 710 and sum and normalizer block 760. Filters 710 are formed of three successive filters 710*a*, 710*b* and 710*c*. The individual compound kernel, k, from kernels 610 (see FIG. 6) effectively employed at any one time at each level will be separately identified as to its level, i.e. k1, k2 and k3. Furthermore, since all of three filters are identical, only first-level filter 710*a*, as shown in FIG. 7, will be discussed in detail. Filter 710*a* is formed of down-sizing convolver 715 followed by non-linear squarer (rectifier) 720. Incoming values for a single color axis (e.g., R, G or B values), of a given input image, illustratively 256×256 pixels in size, appearing on path 408 is routed to first-level filter 710*a* and, within that filter, first to down-sizing convolver 715. Within this convolver, the image is first convolved horizontally by one-dimensional horizontal down-sizing convolver 717 followed by one-dimensional vertical down-sizing convolver 718. At any one time, down-sizing convolver 715 uses a pair of half-level kernels that are collectively separated from compound kernel k1. A first-level response image resulting from convolver 715 and appearing on path 719 is one-fourth the size, e.g. 128×128 pixels, of the input image. This first-level response image is then routed to non-linear squarer 720 for rectification, i.e. to eliminate all negative signs in the pixel values therefrom. The resulting rectified image appearing on path 725 depicts energy content in the first-level response image. This rectified image is then applied, via path 725, to second-level filter 710*b* and specifically therein to an input of down-sizing convolver 730. This convolver, in an identical fashion to convolver 715, convolves the rectified image using separate horizontal and vertical convolutions with a pair half-level kernels. These half-level kernels are those separated from compound kernel k2. Down-sizing convolver 730 produces a second-level response image, 64×64 pixels in size, on path 733, which, in turn, is applied to non-linear squarer 735 for rectification. A resulting second-level rectified image is routed, via path 740, to an input of filter 710*c* and specifically of down-sizing convolver 745. This convolver, in an identical fashion as convolvers 715 and 720, convolves the rectified image using separate horizontal and vertical convolutions with a pair half-level kernels. These half-level kernels are those separated from compound kernel k3. Down-sizing convolver 745 produces a third-level response image, 32×32 pixels in size, on path 747, which, in turn, is applied to non-linear squarer 750 for rectification. A resulting third-level rectified image is routed, via path 758, to sum and normalizer 760. Block 760 sums the all the pixel values across the entire third-level rectified image to yield a single resulting summed value which is then normalized, i.e. divided by the size of this image, which here is 1024 (32×32). The resulting normalized value, appearing on path 770, which has been generated through three successive convolutions with corresponding kernels (k1, k2, k3), is the filter response for one of the 3×25$^3$ image characteristics for the input image. As such, that value constitutes a corresponding element, as signified by line 775, in the signature for the input image, and specifically in the sub-vector for a corresponding color axis of that input image.

To gain an enhanced understanding of my iterative convolution filtering as used in signature computation engine 410, consider FIGS. 8A and 8B which collectively depict a flowchart of signature computation process 800 which is performed by engine 410 to yield a complete signature vector, S. The proper alignment of the drawing sheets for these two figures is shown in FIG. 8. This process assumes that the pixel values for each color axis for a given input image, whose signature is to be determined, are already accessed, from an appropriate region of memory, and are available for subsequent processing. For the sake of simplicity and easier understanding, though, as noted above, separable half-level kernels with separate one-dimensional convolutions are used in lieu of each two-dimensional convolution with a compound kernel, the following discussion will merely omit this aspect. The manner through which process 800 can be modified to accomplish this aspect would be readily apparent to those skilled in the art without any further explanation.

Upon entry into process 800, execution first proceeds to block 803. This block selects a first color axis as a current color, c, of the input image to be processed. The pixel values for each color axis in the color space of the input image will be completely processed to yield a complete sub-vector, $S_C$, of the image signature, prior to processing pixel values for the next such color axis. Once block 803 executes, execution proceeds to block 806 to initialize the value of each of four pointers, j, l, m and h, to zero. Pointers j, l and m are indices to the compound kernels (particularly the corresponding pair of half-level kernels) that will be used at each of the three levels at any one time. Pointer h is an index to a current element (one of 25$^3$ such elements) in the signature sub-vector for the color axis then being processed. Once all these pointers have been initialized, execution proceeds to block 809 which increments the value of pointer h by one, hence pointing to the next element in the signature sub-vector then being formed. Thereafter, execution passes to decision block 815 to test whether the current value of pointer j equals 25, i.e. whether all 25 compound kernels have been used at the first level. If any of these kernels remain to be used, then decision block 815 routes execution, via NO path 816, to block 852. The latter block increments pointer j to specify the next kernel, k1, to be used at the first level. Once this occurs, execution proceeds to first level filter block 860.

Within first level filter block 860, execution proceeds to block 862 which convolves all the pixel values of the input image and specifically for the current color, i.e. $I_{IN}(c)$, with kernel k1, i.e. k(j), to yield a first-level filtered response image, $I_1$. This response image is then rectified, through non-linear squaring performed by execution of block 866, to yield first-level output image $I_{1f}$. The output image is then passed to second-level filter 870. Within second level filter block 870, execution proceeds to block 872 which convolves all the pixel values of the first-level output image with kernel k2, i.e. k(l), to yield a second level filtered response image, $I_2$. This response image is then rectified, through non-linear squaring performed by execution of block 876, to yield second-level output image $I_{2f}$. For the third iterative convolution, the second-level output image is then passed to third level filter 880. Within third-level filter block 880, execution proceeds to block 882 which convolves all the pixel values of the second-level output image with kernel k3, i.e. k(m), to yield a third level filtered response image, $I_3$. This response image is then rectified, through non-linear squaring performed by execution of block 886, to yield third-level output image $I_{3f}$. Once third-level filter 880 completes its execution, block 890 is executed. This block sums all the pixel values, $p_{3f}(i)$, in the third-level output image for the current color and normalizes the resulting sum by the number (P) of pixels in this image (here since the image size is 32×32, P equals 1024). The resultant normalized sum is then stored in the corresponding signature element (i.e. element h) within the sub-vector for the current color, i.e. $S_c(h)$.

Once the element value is stored within the signature sub-vector, execution loops back, via path 895, to block 809 to increment the value of pointer h by one to point to the next successive element within the signature sub-vector. Thereafter, execution proceeds to decision block 815 to again test whether the input image has been separately convolved with all the first level kernels. If not, execution proceeds, via NO path 816 from decision block 815, to block 852 to increment pointer j by one in order to point to the next first level kernel. Processing then continues, in the manner set forth above, to iteratively and separately convolve the input image with each of the remaining first level kernels, for given k2 and k3 kernels.

As noted above, each input image, and for each color axis, is convolved, at a first level, with each one of 25 different compound kernels (i.e. kernel k1) in set k to yield 25 different first-level response images. Each of these 25 different first-level response images is itself convolved, at a second level with each one of 25 different kernels (i.e. kernel k2) in set k to yield 25$^2$ different second-level response images. Each of the second-level response images is itself convolved at a third level with each one of the 25 different kernels (i.e. kernel k3) again in set k to yield 25$^3$ third-level response images.

Accordingly, if the input image has been convolved with all the 25 kernels, i.e. j equals 25, then decision block 815 routes execution, via YES path 817, to decision block 822. This block determines whether all the convolutions have occurred at the second level, i.e. whether the value of pointer l equals 25. If all the second level convolutions have not occurred, i.e. the value of pointer l is less than 25, then this decision block routes execution, via NO path 823, to block 854. This latter block resets the value of pointer j to one in order to point to the first kernel and hence iterate through all 25 kernels at the first level, and increments pointer l to point to the next kernel to use at the second-level. Execution then proceeds to first level filter 860, and so forth to undertake the resulting convolutions.

Now, if all the second level convolutions have been performed for a given kernel at the third level, then decision block 822 routes execution, via YES path 824, to decision block 827. This block determines whether all the convolutions have occurred at the third level, i.e. whether the value of pointer m equals 25. If all the third level convolutions have not occurred, i.e. the value of m is less than 25, then this decision block routes execution, via NO path 828, to block 856. This latter block resets the value of each of pointers j and l to one in order to point to the first kernel and hence iterate through all 25 kernels at the first and second levels, and increment pointer m to point to the next kernel to use at the third level. Execution then proceeds to first level filter 860, and so forth to undertake the resulting convolutions.

Once all the convolutions have been performed at the first, second and third levels, i.e. m equals to 25; hence $25^3$ characteristic values have been produced and stored within a signature sub-vector for the current color, decision block 827 routes execution, via YES path 829, to decision block 833. This latter decision block determines whether all the color axes have been processed for the input image, e.g. for an RGB input image, whether pixel values for R, G and B have been separately processed to yield signature sub-vectors. If any color axis remains to be processed for the input image, then decision block 833 routes execution, via NO path 835, to block 840. This latter block selects the next successive unprocessed color axis as current color c. Execution then loops back, via path 845, to block 806, to generate the entire signature sub-vector for this color axis, and so forth. Alternatively, if all the color axes have been processed, then the entire signature for the input image has been generated and hence execution exits from process 800, via YES path 834 emanating from decision block 833.

Figure 9:
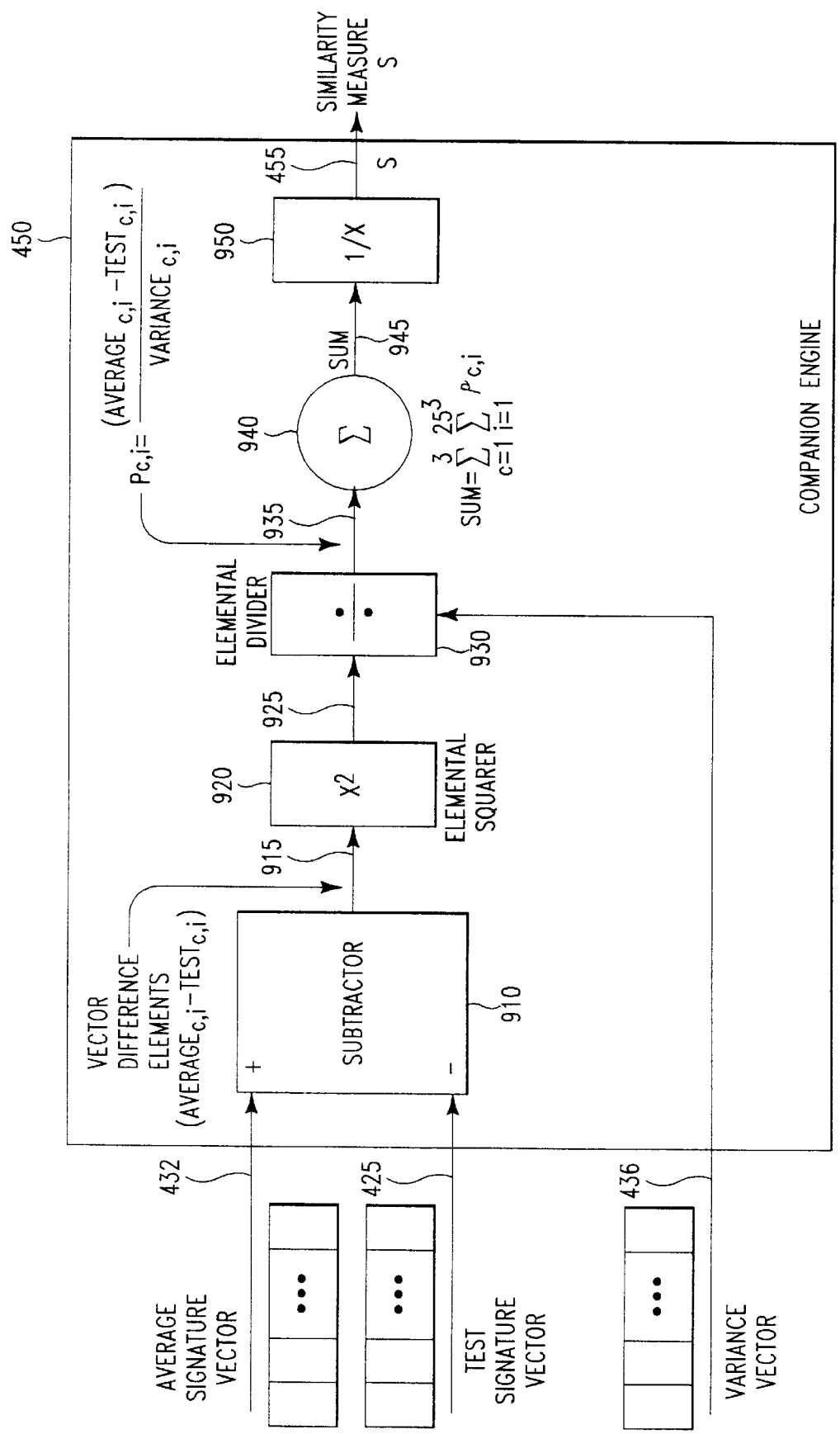
FIG. 9 depicts a block diagram of comparison engine 450 shown in FIG. 4.

FIG. 9 depicts a block diagram of comparison engine 450 shown in FIG. 4. As stated above, once the average and variance vectors are computed, then the signature of each image, i.e. as a so-called "test" image having a "test" signature vector, in the image database is compared against the average and variance vectors. During comparison operations, the average and variance vectors illustratively remain fixed. Engine 450 computes a similarity measure as a function of a sum, across all the vector elements and for all the color axes (e.g., R, G and B), of the difference between the corresponding elements in the average and test signature vectors divided by the corresponding element in the variance vector.

As shown in FIG. 9, engine 450 contains subtractor 910, squarer 920, divider 930, summer 940 and reciprocal block 950. Specifically, the average (AVERAGE) and the test signature (TEST) vectors are applied, via paths 432 and 425, respectively, and on a element-by-element and sub-vector by sub-vector basis for the same color axis, c, to corresponding inputs of subtractor 910. The subtractor computes a difference between corresponding elements in the average and test vectors, i.e. $AVERAGE_{c,i} - TEST_{c,i}$ where c is the current color and i is an elemental index in the sub-vector. The resulting vector element difference is routed, via path 915, to squarer 920 which squares the difference to yield a positive result. A resulting squared difference is then applied, via path 925, to one input of divider 930. The corresponding element in the variance vector is routed, via path 436, to another input of the divider. Block 930 divides the squared difference by the corresponding element in the variance vector and applies the result, via path 935, to summer 940. The summer, in turn, sums all the results appearing on path 935 across all the elements in the entire signature, i.e. across all the elements in the sub-vector for each and every color axis (e.g. that for R, G and B). The resulting sum, being in effect a single numeric difference measure (the difference is the numerator) for the entire test image, is inverted by reciprocal block 950 to yield similarity measure S on path 455. This measure is a single number reflective of the quantitative similarity between all the query images, taken collectively, and the test image then being compared to it.

Figure 10A:
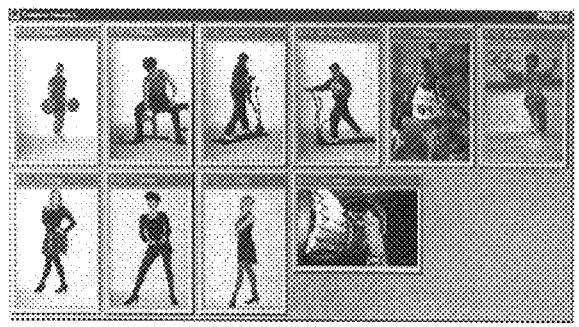
Figure 10B:
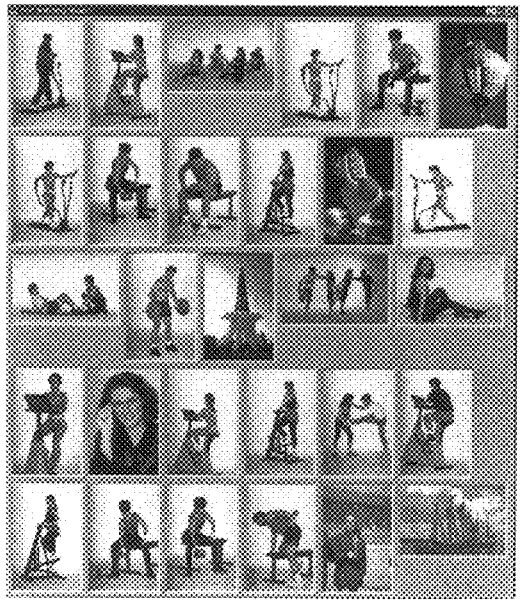
Figure 11A:
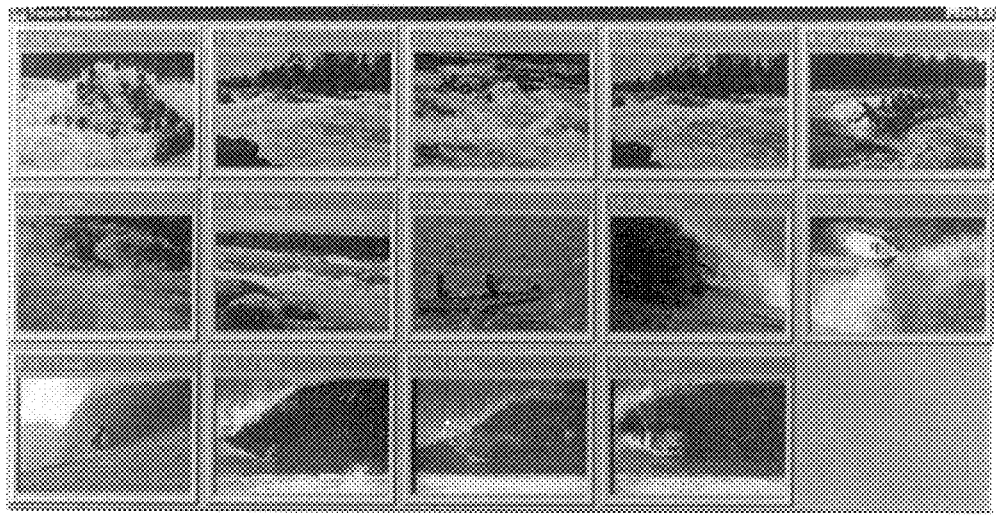
Figure 11B:
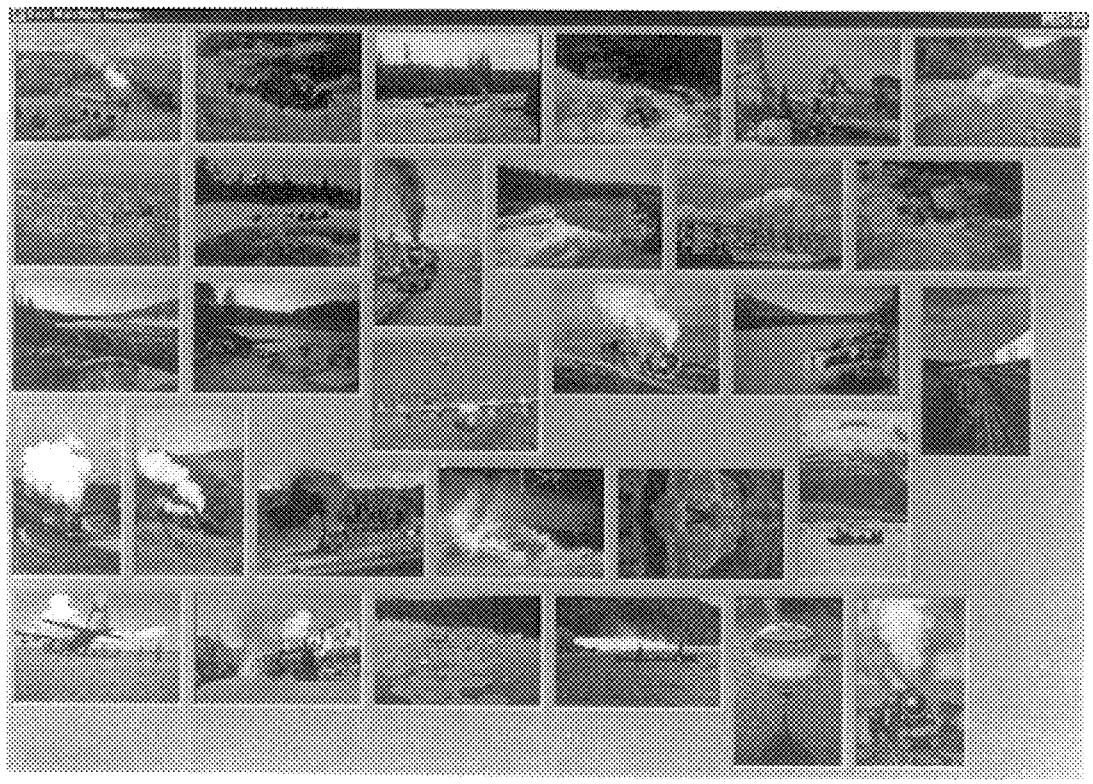

To illustrate the empirical performance of my inventive image classification and retrieval system, as thusfar described, consider FIGS. 10–12. In that regard, FIG. 10A shows a first set of query images which I provided to my inventive system. My goal was to retrieve image(s) already stored within an image database that were similar to the query images. Each image was approximately 256×256 in size. The image database consisted of approximately 1500 images randomly selected from a set of digitized photographs, specifically "Corel Professional Photos", available on compact disk (CD-ROM) from Corel Corporation of Ottawa, Canada (COREL is a registered trademark of Corel Corporation). I implemented the inventive system on a standard personal computer that utilized dual PENTIUM PRO 200 MHz processors (PENTIUM PRO is a registered trademark of the Intel Corporation). This implementation calculated a complete image signature for each of the 1500 images in approximately 1.5 minutes/image. The system retrieved each output image from the database in approximately 20 seconds. For the query image set pictorially shown in FIG. 10A, a resulting group of images retrieved by the inventive system, i.e. search results, is pictorially shown in FIG. 10B. Similarly, for different groups of query images, all other test conditions being equal, shown in FIGS. 11A and 12A, the resulting search results are pictorially shown in FIGS. 11B and 12B, respectively.

Figure 13:
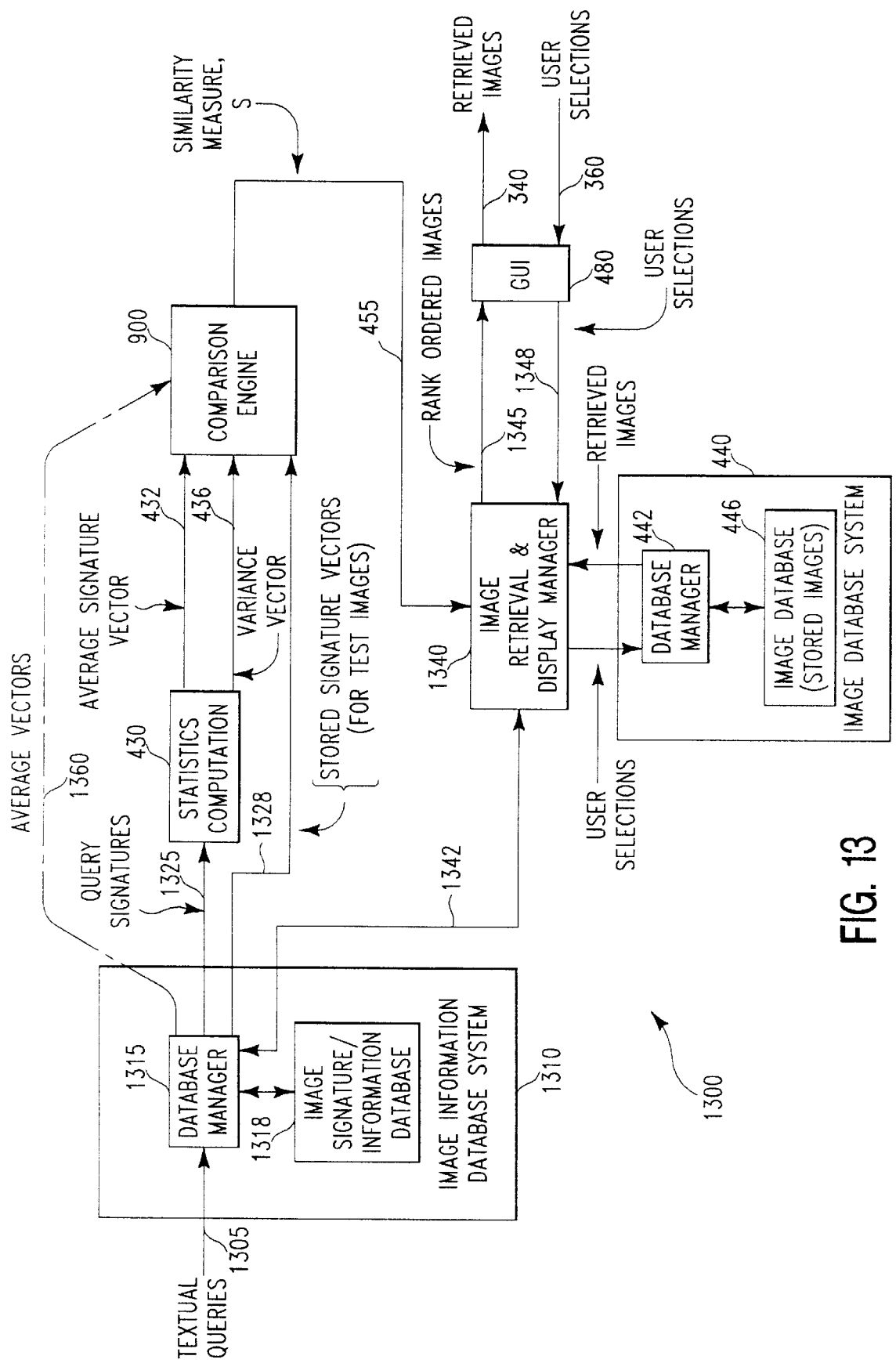
FIG. 13 depicts a block diagram of another embodiment, here system 1200, of the inventive image retrieval system that forms part of application programs 229 shown in FIG. 3.

FIG. 13 depicts a block diagram of another embodiment, here system 1200, of the inventive image retrieval system that forms part of application programs 229 shown in FIG. 3.

As discussed above, once a signature has been calculated for an image, that signature can be stored for further retrieval thereby obviating the need to apply that image, either as a query or test image, to the signature computation engine and recalculate its signature. The embodiment shown in FIG. 13 utilizes this concept.

In particular, digitized images are stored within image database system 440, which itself contains image database 446 and database manager 442. For each image stored within database 446, the complete signature for that image (as well as other information such as a pointer to that image within database 446) is stored within image information database system 1310. System 1310 contain image signature/information database 1318 and database manager 1315. Whenever an image is applied to system 1300 for storage therein, the signature of that image is calculated, in the manner set forth above, and a textual description of the semantic content of that image, using generic terms, is also provided by a user. The signature and the semantic content, and a pointer to the image, are then stored within system 1310, and particularly within database 1318. Whenever a user subsequently desires to retrieve a stored image(s) from system 1300, the user provides a textual based query, rather than one or more query images, to the system. This textual query is routed, via path 1305, to database manager 1315. This manager then accesses all the entries within database 1318 that contain one or more terms in the query and, should the user desire to preview the query image(s), provides corresponding image pointers, via path 1342, for each of these entries to image retrieval and display manager 1340. Manager 1340 will then access each of the images for which a pointer has been provided. These images are then displayed, by manager 1340 and via paths 1345 and 340, and GUI 480, on the screen of a display monitor (not specifically shown in FIG. 13). The user can then select all or some of the images to serve as query images. The ensuing selections will then be routed back, via paths 360 and 1348, GUI 480, and manager 1340 and path 1342, to manager 1315 which, in turn, will retrieve the complete signature of each of the query images and route that signature, via path 1325, to statistics computation block 430. Block 430 will compute the average and variance vectors for these signatures, in the manner set forth above. Once these vectors are determined, then each stored signature residing within database 1318 will be retrieved and compared, by comparison engine 900 (as described above), to the average and variance vectors, to yield associated similarity measures. Those images, such as, e.g., five or ten, that possess the highest similarity measures will be retrieved by manager 1340 and presented to the user, via GUI 480, for user selection.

Furthermore, if the user, while previewing query images, is dissatisfied with any or all of the query images, can refine his(her) textual query, through suitable interaction with image retrieval and display manager 1340 and database manager 1315, to engender additional or substitute query images, for preview, and associated signatures for subsequent use during image retrieval.

Alternatively, the user can decide to forego previewing the query images, in which case, all the stored signatures yielded by the textual queries to database 1318 will be used as query image signatures.

Operating on precomputed signatures in this fashion drastically improves retrieval time inasmuch as a search into a textual database consumes considerably less time than calculation of an image signature.

In this manner, a textual vocabulary can be used to define a class of images, based on the semantic description of these images, and, in view of the stored signature for each such image in the class, to expedite image retrieval.

Clearly, those skilled in the art will readily appreciate that not only can the signature of each image residing in an image database be stored for subsequent use, but also so too can the average and variance vectors for any group of images. These vectors can be precomputed for a given group of images, then stored within database 1318 within database system 1310, and, at some time later during image retrieval, accessed, via database manager 1315 and path 1360, and directly compared, by comparison engine 900, against each signature in the image database to yield an associated similarity measure. As with storage of precomputed signatures, storage and utilization of precomputed average and variance vectors advantageously eliminates any need to directly process images during a retrieval operation. The latter further reduces processing time over merely storing complete signatures inasmuch as average and variance statistics for a group of signatures need not be calculated during a retrieval operation.

In this manner, a user can apply a class (a "unit") of related images of a unitary semantic concept, such as a "red car" or "white sandy beach" to the system, provide, e.g., a linguistic description, by way of one or more linguistic terms (whether numeric or keyboard based), and have the images stored, and the signatures and average and variance vectors computed therefor and, along with the accompanying description, stored for this image class (group) for future use. These vectors form a mathematical based semantic description of this image class. In addition, the class can be readily supplemented later with an additional image(s). Doing so will necessitate that the average and variance vectors are updated. As additional images are added to any class and the vectors updated accordingly, these vectors advantageously become increasingly robust and discriminating descriptors of that class.

By just applying a textual query to database system 1318 with words (or other terms) describing the semantic concept, and/or searching through a stored dictionary of such terms to select those terms (specifically keywords) of interest, the average and variance vector values for each different class can be readily accessed from this database system and then used for image comparison. In that regard, these vectors can be readily combined numerically, on an element-by-element basis, through well known statistical equations to yield new average and variance vectors. As such, a user can provide terms descriptive of a number, such as two or more, different image classes (e.g. a "red car", and a "white sandy beach") with the system computing, from the average and variance vectors for each class, appropriate average and variance vectors for images that form the intersection of the desired classes (e.g. images depicting "a red car on a white sandy beach"). Moreover, the average and variance vectors of various classes of stored images can be combined to reflect a textual search delineated with different, such as "OR", and/or more sophisticated Boolean search connectors or parenthetical search expressions, such as "(class a and class b) or class c" where a, b and c are stored image classes (e.g. a "red car on a white sandy beach, or a blue car").

As noted above, my inventive system can incorporate a web crawler to automatically find and download images from Internet accessible sources. Here, such a crawler is particularly useful inasmuch as individuals often become bored in selecting more than 10–12 images at a time, such as for use as query images. Not only would use of a crawler automatically download images, but also that crawler could download descriptive text that accompanies each such image. This text could be automatically searched to locate existing keywords, i.e. any of those previously indexed into the stored dictionary used in the inventive retrieval system, so as classify that image into an existing class. Alternatively, if no existing keywords exist, a certain word(s) can be parsed from the text to define a new class (or, if no such text exists or it is inadequately descriptive, appropriate human intervention could be requested to define the class) into which that image is to be classified for future retrieval. Once a new database entry is established for that image and the image is stored therein, its signature vector will be computed and stored, and if that image is to be added to an existing semantic class, the average and variance vectors (and image pointers) for that class will be appropriately updated and stored for future use. In this manner, new image classes can be defined and existing image classes expanded, with substantial numbers of images added to each with relatively modest user intervention. As such, use of my invention is likely to drastically reduce the human effort associated with classifying massive numbers of images and accurately retrieving images therefrom.

Although various embodiments which incorporate the teachings of the present invention have been shown and described in detail herein, those skilled in the art can readily devise many other embodiments that still utilize these teachings.

I claim:

1. Apparatus, responsive to an input image, for generating a signature therefor and having a numeric value for each of a plurality of pre-defined characteristics present in the input image, the apparatus comprising:

at least three successive convolution filters, responsive to the input image, for producing through iterative convolution a final response image for each one of said pre-defined characteristics so as to yield a plurality of final response images, wherein each of said filters comprises:

a convolver for separately convolving pixel values for each incoming image with each one of a plurality of predefined kernels to yield a corresponding one of a plurality of convolved images, said each incoming image for a first one of said filters being the input image, and for each subsequent filter being a different corresponding filter input image related to each separate convolved image produced by an immediately preceding one of said convolution filters; and a sum and normalizer for separately summing all pixel values in each one of the final response images produced by a last one of the convolution filters to yield a resultant sum and for normalizing the resultant sum by a total number of pixels in the final response image produced by the last filter so as to yield a value of a different corresponding one of the pre-defined characteristics.

2. The system in claim 1 further comprising an image comparator for comparing corresponding ones of the values of said pre-defined characteristics of the signature for each of first and second input images so as to yield an output value whereby said output value numerically represents a degree of similarity between said first and second input images.

3. The system in claim 1 wherein the plurality of convolution filters further comprises connected, first, second and third convolution filters, arranged in succession, for iteratively convolving pixel values in the input image, wherein the first, second and third filters separately convolves the pixel values in the incoming image correspondingly applied to the first, second and third filters with each one of a plurality of individual kernels in first, second and third sets of predefined kernels, respectively.

4. The system in claim 3 wherein the first, second and third sets of kernels are identical.

5. The system in claim 4 wherein each of said convolvers comprises a down-sizing convolver.

6. The system in claim 5 wherein each of the convolvers further comprises serially connected horizontal and vertical down-sizing convolvers for convolving the incoming image applied thereto with first and second half-level kernels, respectively, to yield corresponding ones of the convolved images; each one of said individual kernels being a derivative of a Gaussian kernel and separable into a corresponding pair of said first and second half-level kernels.

7. The system in claim 6 wherein each of the convolution filters further comprises a squarer, responsive to each of the convolved images produced in said each filter, for squaring a magnitude of each pixel value in said each image and produced by the convolver in said each filter so as to yield, as output of said each filter, a corresponding one of a plurality of filter response images, wherein the filter response images produced by the last convolution filter are the final response images.

8. The system in claim 5 wherein each of said first, second and third set of kernels is an identical set of 25 two-dimensional derivatives of Gaussian kernels, each being 3×3 in size.

9. The system in claim 5 wherein the signature comprises a different corresponding sub-vector for image characteristic values for each color axis in the input image.

10. Apparatus, responsive to an input image having pixel values for a plurality (C) of different color axes, for generating a signature therefor and having a numeric value for each of a plurality of pre-defined characteristics present in the input image, the apparatus comprising:

a plurality of convolution filters, responsive to the pixel values of the input image for each one of said color axes, for producing a final response image for each one of said pre-defined characteristics so as to yield a plurality of final response images, comprising:

first, second and third filters, arranged in succession, for iteratively and separately convolving the pixel values in an incoming image correspondingly applied to the first, second and third filters with each one of K individual kernels in first, second and third sets of predefined kernels, respectively, to yield a corresponding one of a plurality of convolved images, wherein said incoming image for a first one of said filters is the pixel values of the input image and for said color axis, and the incoming image for each subsequent one of the filters is a different corresponding filter input image related to each separate convolved image for said color axis and produced by an immediately preceding one of said filters; and a sum and normalizer for separately summing all pixel values in each one of the final response images produced by a last one of the convolution filters to yield a resultant sum and for normalizing the resultant sum by a total number of pixels in the final response image produced by the last filter so as to yield a value of a different corresponding one of the pre-defined characteristics;

whereby the signature has values for $C \times K^3$ different ones of said characteristics.

11. The apparatus in claim 10 further comprising an image comparator for comparing corresponding ones of the values of said pre-defined characteristics of the signature for each of first and second input images so as to yield an output value whereby said output value numerically represents a degree of similarity between said first and second images.

12. The system in claim 10 wherein the first, second and third sets of kernels are identical.

13. The system in claim 12 wherein each of said convolvers comprises a down-sizing convolver.

14. The system in claim 13 wherein each of the convolvers further comprises serially connected horizontal and vertical down-sizing convolvers for convolving the incoming image applied thereto with first and second half-level kernels, respectively, to yield corresponding ones of the convolved images; each one of said individual kernels being a derivative of a Gaussian kernel and separable into a corresponding pair of said first and second half-level kernels.

15. The system in claim 14 wherein each of the convolution filters further comprises a squarer, responsive to each of the convolved images produced in said each filter, for squaring a magnitude of each pixel value in said each image and produced by the convolver in said each filter so as to yield, as output of said each filter, a corresponding one of a plurality of filter response images, wherein the filter response images produced by the last convolution filter are the final response images.

16. The system in claim 13 wherein each of said first, second and third set of kernels is an identical set of 25 two-dimensional derivatives of Gaussian kernels, each being 3×3 in size.

17. A method for generating a signature for an input image and which has a numeric value for each of a plurality of pre-defined characteristics present in the input image, the method comprising the steps of:

producing, in response to the input image and through iterative convolution using three successive convolution filters, a final response image for each one of said pre-defined characteristics so as to yield a plurality of final response images, wherein in each of said filters:

separately convolving pixel values for each incoming image with each one of a plurality of predefined kernels to yield a corresponding one of a plurality of convolved images, said each incoming image for a first one of said filters being the input image, and for each subsequent filter being a different corresponding filter input image related to each separate convolved image produced by an immediately preceding one of said convolution filters;

separately summing all pixel values in each one of the final response images produced by a last one of the convolution filters to yield a resultant sum; and normalizing the resultant sum by a total number of pixels in the final response image produced by the last filter so as to yield a value of a different corresponding one of the pre-defined characteristics.

18. The method in claim 17 wherein the producing step comprises the step of iteratively convolving pixel values in the input image though successive first, second and third convolution filters, wherein the iterative convolving step comprises the step of separately convolving, through first, second and third filters, the pixel values in the incoming image correspondingly applied to the first, second and third filters with each one of a plurality of individual kernels in first, second and third sets of predefined kernels, respectively.

19. The method in claim 17 further comprising the step of comparing corresponding ones of the values of said pre-defined characteristics of the signature for each of first and second input images so as to yield an output value whereby said output value numerically represents a degree of similarity between said first and second input images.

20. The method in claim 18 wherein the first, second and third sets of kernels are identical.

21. The method in claim 20 wherein said separately convolving step comprises the step of performing a down-sizing convolution.

22. The method in claim 21 wherein the separately convolving step further comprises the step of convolving the incoming image, through successive horizontal and vertical down-sizing convolvers, with first and second half-level kernels, respectively, to yield corresponding ones of the convolved images; each one of said individual kernels being a derivative of a Gaussian kernel and separable into a corresponding pair of said first and second half-level kernels.

23. The method in claim 22 further comprising, in each of the convolution filters, the step of squaring, in response to each of the convolved images produced in said each filter, a magnitude of each pixel value in said each image and produced by the separately convolving step performed in said each filter so as to yield, as output of said each filter, a corresponding one of a plurality of filter response images, wherein the filter response images produced by the last convolution filter are the final response images.

24. The method in claim 21 wherein each of said first, second and third set of kernels is an identical set of 25 two-dimensional derivatives of Gaussian kernels, each being 3×3 in size.

25. A computer-readable media having computer-executable instructions stored thereon for performing the steps of claim 17.

26. A method for generating a signature for an input image having pixel values for a plurality (C) of different color axes, for generating a signature therefor and having a numeric value for each of a plurality of pre-defined characteristics present in the input image, the method comprising the steps of:

producing, in response to the pixel values of the input image for each one of said color axes, a final response image for each one of said pre-defined characteristics so as to yield a plurality of final response images, comprising:

iteratively and separately convolving, through successively arranged first, second and third filters, the pixel values in an incoming image correspondingly applied to the first, second and third filters with each one of K individual kernels in first, second and third sets of predefined kernels, respectively, to yield a corresponding one of a plurality of convolved images, wherein said incoming image for a first one of said filters is the pixel values of the input image and for said color axis, and the incoming image for each subsequent one of the filters is a different corresponding filter input image related to each separate convolved image for said color axis and produced by an immediately preceding one of said filters; and separately summing all pixel values in each one of the final response images produced by a last one of the convolution filters to yield a resultant sum; and normalizing the resultant sum by a total number of pixels in the final response image produced by the last filter so as to yield a value of a different corresponding one of the pre-defined characteristics;

whereby the signature has values for C×K³ different ones of said characteristics.

27. The method in claim 26 further comprising the step of comparing corresponding ones of the values of said pre-defined characteristics of the signature for each of first and second input images so as to yield an output value whereby said output value numerically represents a degree of similarity between said first and second input images.

28. The method in claim 26 wherein the first, second and third sets of kernels are identical.

29. The method in claim 28 wherein said separately convolving step comprises the step of performing a down-sizing convolution.

30. The method in claim 29 wherein the separately convolving step further comprises the step of convolving the incoming image, through successive horizontal and vertical down-sizing convolvers, with first and second half-level kernels, respectively, to yield corresponding ones of the convolved images; each one of said individual kernels being a derivative of a Gaussian kernel and separable into a corresponding pair of said first and second half-level kernels.

31. The method in claim 30 further comprising, in each of the convolution filters, the step of squaring, in response to each of the convolved images produced in said each filter, a magnitude of each pixel value in said each image and produced by the separately convolving step performed in said each filter so as to yield, as output of said each filter, a corresponding one of a plurality of filter response images, wherein the filter response images produced by the last convolution filter are the final response images.

32. The method in claim 29 wherein each of said first, second and third set of kernels is an identical set of 25 two-dimensional derivatives of Gaussian kernels, each being 3×3 in size.

33. A computer-readable media having computer-executable instructions stored thereon for producing the steps of claim 26.

* * * * *